United States Patent
Kellogg

(10) Patent No.: US 11,188,867 B2
(45) Date of Patent: Nov. 30, 2021

(54) SYSTEM FOR PROVIDING END-TO-END TRANSPORTATION AND CARE FOR ANIMALS

(71) Applicant: Woofy Enterprises LLC, Ashland, VA (US)

(72) Inventor: Jeffrey B. Kellogg, Ashland, VA (US)

(73) Assignee: Woofy Enterprises LLC, Ashland, VA (US)

( * ) Notice: Subject to any disclaimer, the term of this patent is extended or adjusted under 35 U.S.C. 154(b) by 334 days.

(21) Appl. No.: 16/050,108

(22) Filed: Jul. 31, 2018

(65) Prior Publication Data

US 2018/0336518 A1 Nov. 22, 2018

Related U.S. Application Data

(63) Continuation of application No. 14/925,252, filed on Oct. 28, 2015, now abandoned.

(60) Provisional application No. 62/072,982, filed on Oct. 30, 2014.

(51) Int. Cl.
| | |
|---|---|
| *A01K 1/00* | (2006.01) |
| *G06Q 10/08* | (2012.01) |
| *A01K 29/00* | (2006.01) |
| *A01K 11/00* | (2006.01) |

(52) U.S. Cl.
CPC ........ *G06Q 10/0832* (2013.01); *A01K 11/006* (2013.01); *A01K 29/005* (2013.01)

(58) Field of Classification Search
CPC ....... C02F 2103/20; A01K 1/011; A01K 1/01; A23K 10/12; A23K 50/10
USPC ............................ 705/13, 7.11, 1.1; 119/201
See application file for complete search history.

(56) References Cited

U.S. PATENT DOCUMENTS

| | | | |
|---|---|---|---|
| 5,524,573 A * | 6/1996 | Hart | A01K 1/0245 119/489 |
| 2002/0084889 A1 | 7/2002 | Bolavage et al. | |
| 2003/0062001 A1 | 4/2003 | Andersson | |
| 2006/0161443 A1 | 7/2006 | Rollins | |
| 2006/0185605 A1 * | 8/2006 | Renz | A01K 29/00 119/51.02 |
| 2008/0097809 A1 * | 4/2008 | Stroman | G06Q 10/063 705/35 |
| 2008/0133127 A1 | 6/2008 | Havens | |

(Continued)

OTHER PUBLICATIONS

Moss, R. Transport of Animals Intended for Breeding, Production and Slaughter A Seminar in the CEO Programme of Coordination of Research on Animal Welfare, Organised by R. Moss, and Held in Brussels, Jul. 7-8, 1981 . 1st ed. 1982. Dordrecht: Springer Netherlands, 1982. Web. (Year: 1982).*

(Continued)

*Primary Examiner* — Akiba K Robinson
(74) *Attorney, Agent, or Firm* — Leonardpatel P.C.; Michael Aristo Leonard, II; Sheetal Suresh Patel

(57) ABSTRACT

An end-to-end animal care solution provides transportation and care services for animals. For instance, transportation of animals to/from a pickup/dropoff location may be provided by one or more buses and grooming services, daycare services, boarding services, training services, spa services, and/or veterinary services may be provided may one or more "ranches." This provides an easy and safe way for owners to give their pets a healthy, pleasant, and engaging experience without having to drive their pets to the actual pet care location.

17 Claims, 31 Drawing Sheets

(56) References Cited

U.S. PATENT DOCUMENTS

| | | | |
|---|---|---|---|
| 2008/0193247 A1* | 8/2008 | Zupancich | B65D 19/10 |
| | | | 410/92 |
| 2009/0164234 A1* | 6/2009 | Sinn | G06Q 10/083 |
| | | | 705/330 |
| 2009/0307973 A1* | 12/2009 | Adams | A01G 9/1423 |
| | | | 47/62 C |
| 2010/0295687 A1* | 11/2010 | Kuzniar | G06Q 10/08 |
| | | | 340/573.3 |
| 2011/0126774 A1* | 6/2011 | Shimizu | A01K 1/03 |
| | | | 119/479 |
| 2012/0225171 A1 | 9/2012 | Garwood | |
| 2014/0046698 A1* | 2/2014 | Skocic | A01K 11/006 |
| | | | 705/3 |
| 2014/0049380 A1 | 2/2014 | Berger et al. | |
| 2014/0052463 A1* | 2/2014 | Cashman | G06Q 20/18 |
| | | | 705/2 |
| 2014/0074742 A1* | 3/2014 | Pratt | G06Q 10/087 |
| | | | 705/333 |
| 2014/0187448 A1 | 7/2014 | O'Banion et al. | |
| 2014/0352625 A1* | 12/2014 | Reginhard | A01K 1/0245 |
| | | | 119/496 |
| 2015/0142594 A1* | 5/2015 | Lutnick | G06Q 50/28 |
| | | | 705/21 |
| 2016/0379102 A1 | 12/2016 | Ferguson | |
| 2017/0234876 A1 | 8/2017 | Davis et al. | |

OTHER PUBLICATIONS

Akiba Kanelle Allen, "Non-Final Office Action", dated Jun. 11, 2018, U.S. Appl. No. 14/925,252.

\* cited by examiner

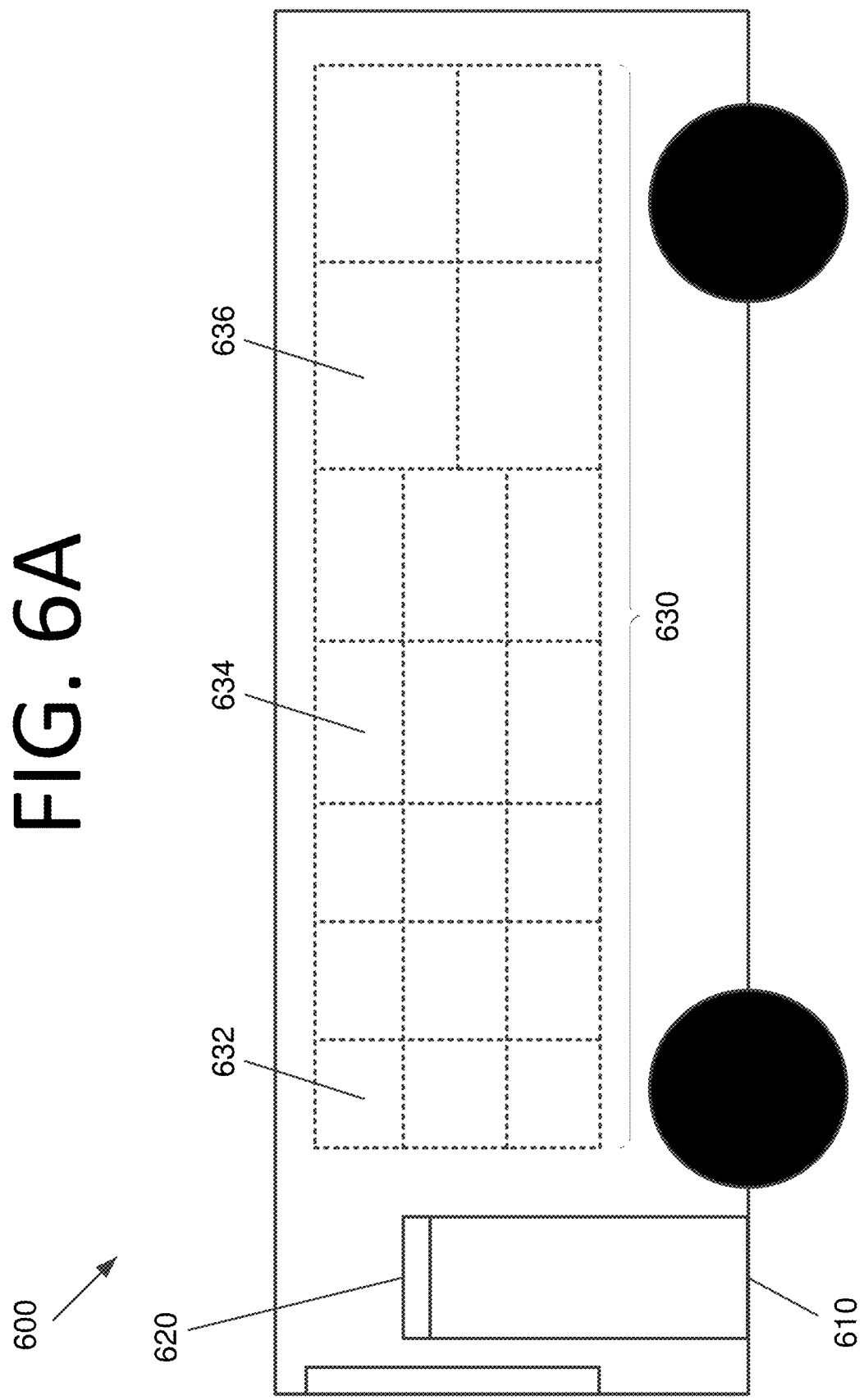

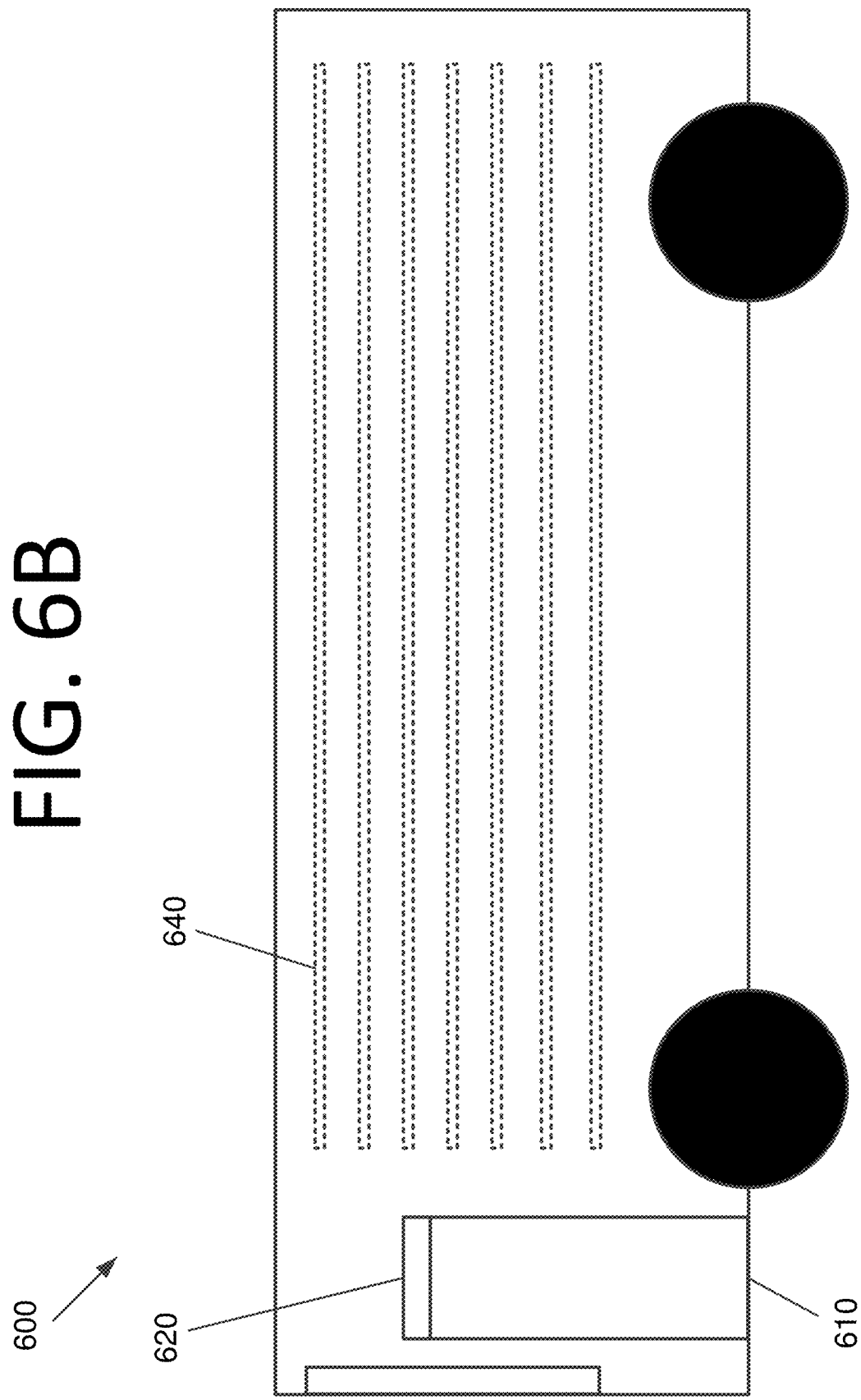

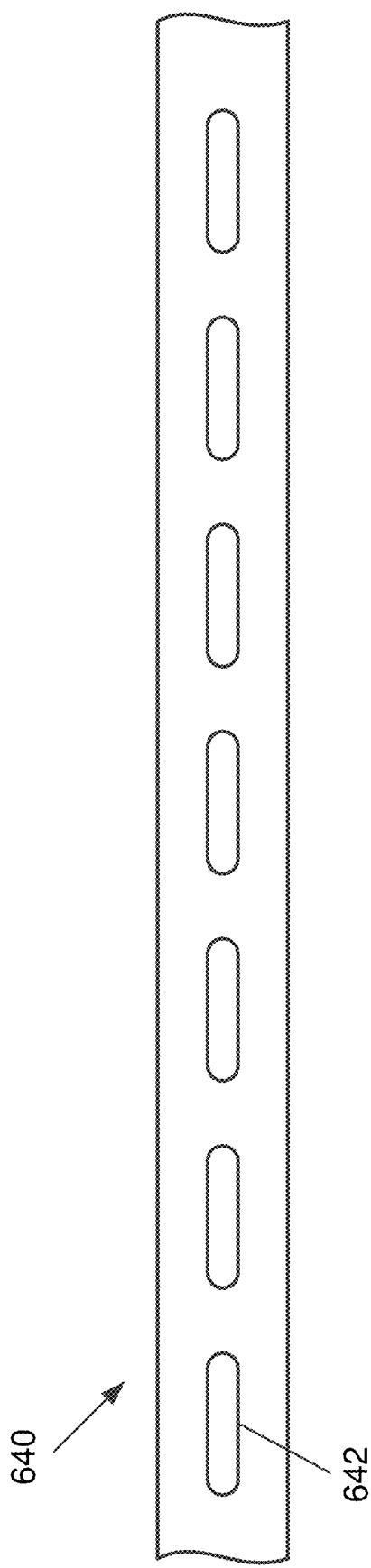

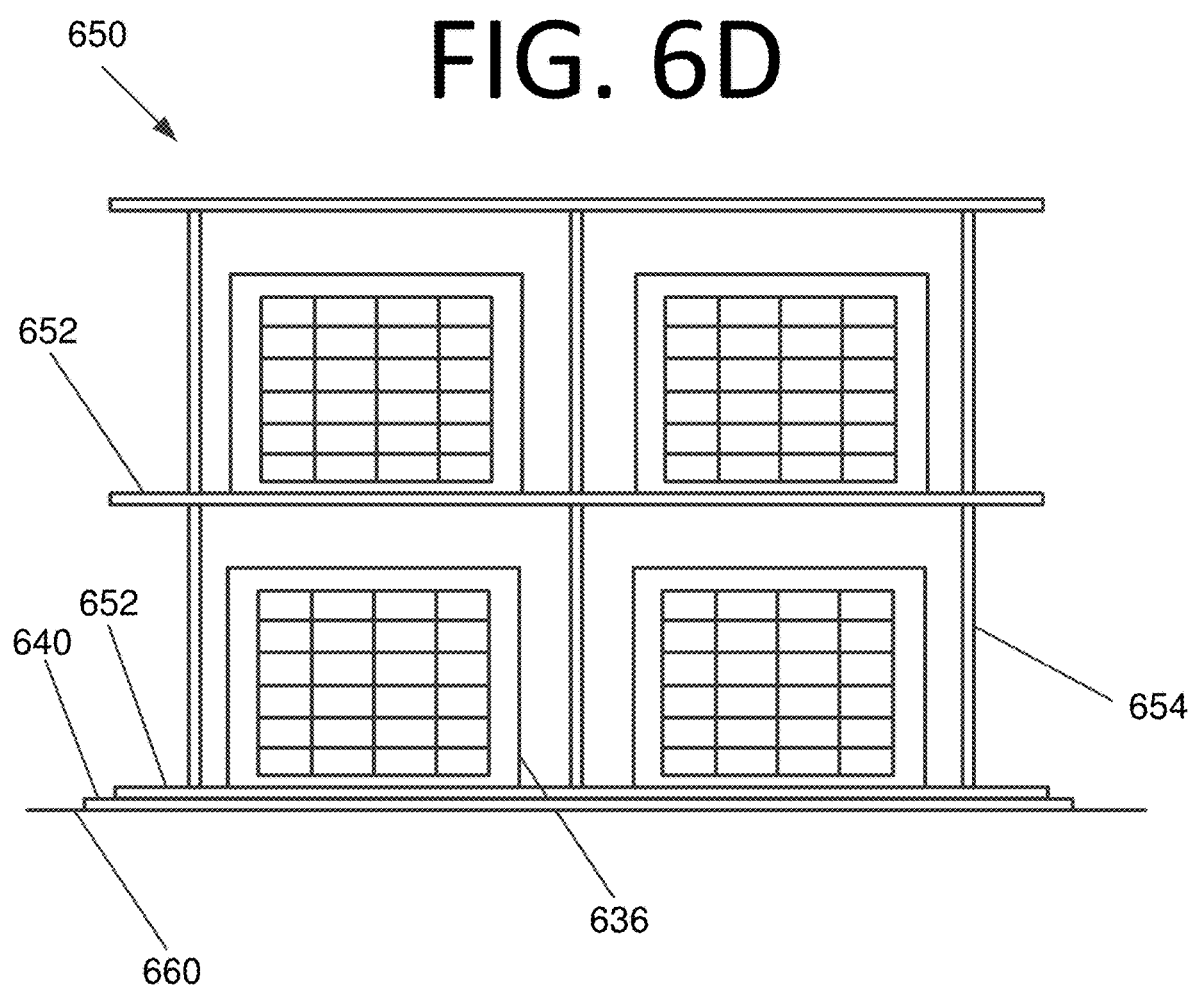

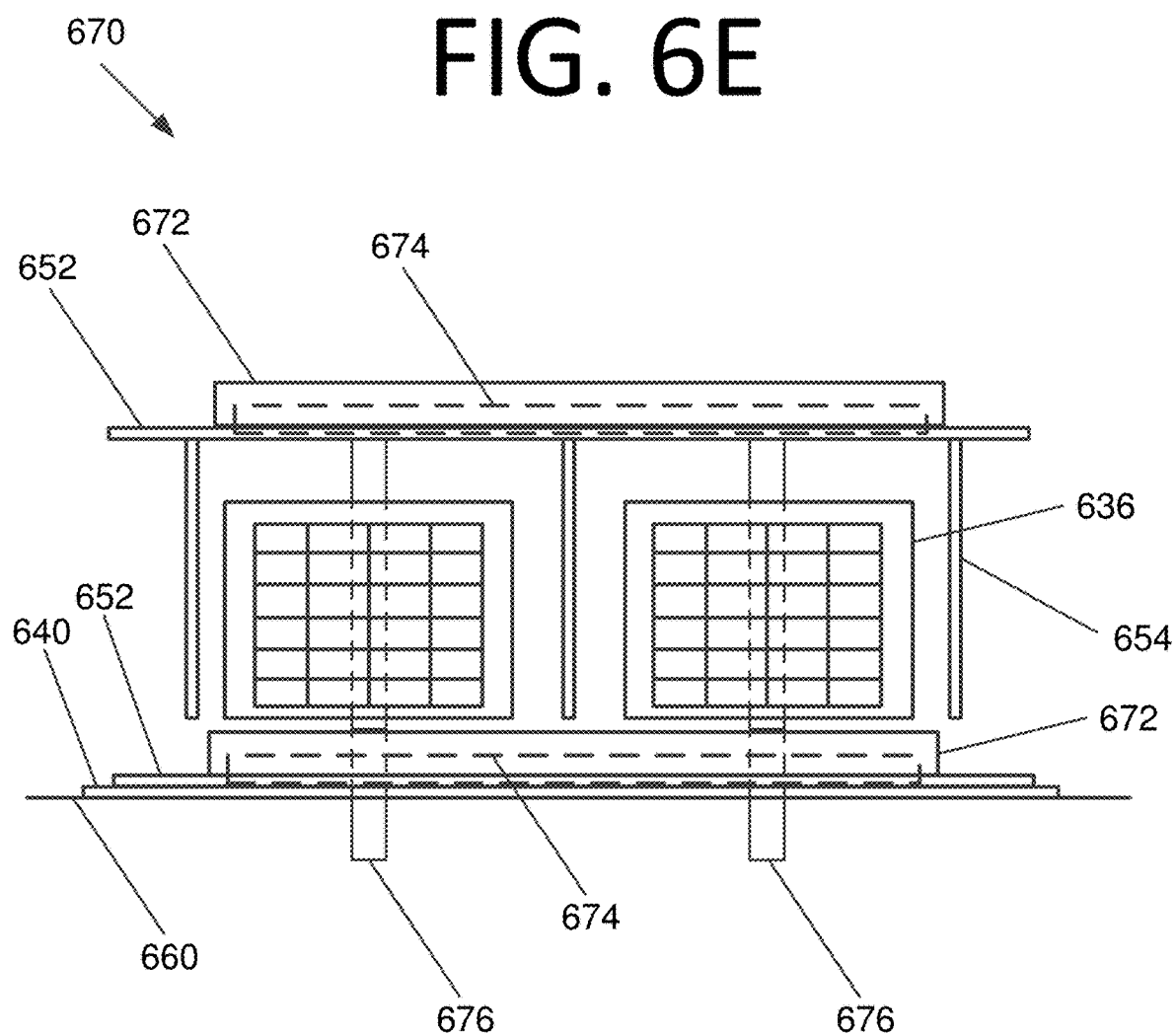

FIG. 12

1200 http://www.exampleranchsite.com/folder1/folder2/med-hist.html

Medical History

Dates of Last Vaccinations:

Rabies: 11/11/2014 Calendar  Parvovirus: 11/11/2014 Calendar

Bordatella: 11/11/2014 Calendar  Distemper: 11/11/2014 Calendar

Annual Checkup Date: 11/11/2014 Calendar

Medications:

Notes:

Submit

FIG. 14 http://www.exampleranchsite.com/folder1/folder2/schedule-services.html

Schedule Services

Type: ● Grooming ○ Veterinary Care ○ Training ○ Spa

Pet Name: Indie

Date: 11/12/2015 [Calendar]

Time: 9:30 ▸ AM ▸

Notes: My dog's hair is a mess! Please cut out any knots.

[Submit]

1400

FIG. 18 http://www.exampleranchsite.com/folder1/folder2/schedule-cam.html

Reserve Camera

Area: ▶ Indoor Play (active)

Date: 11/03/2015  (Calendar)

Time: ▶ 3:30   ▶ PM

Camera: ○ 1   ● 2   ○ 3

Submit

1800

US 11,188,867 B2

SYSTEM FOR PROVIDING END-TO-END TRANSPORTATION AND CARE FOR ANIMALS

CROSS REFERENCE TO RELATED APPLICATION

This application is a continuation of U.S. Nonprovisional patent application Ser. No. 14/925,252 filed Oct. 28, 2015, which claims the benefit of U.S. Provisional Patent Application No. 62/072,982 filed Oct. 30, 2014. The subject matter of these earlier filed applications is hereby incorporated by reference in its entirety.

FIELD

The present invention generally pertains to animal care, and more specifically, to a system for providing end-to-end transportation and care for animals.

BACKGROUND

Conventional facilities may provide boarding or veterinary services for animals. For instance, "doggy daycare" facilities typically provide one or more enclosed areas in a building where dogs can socialize under supervision. Doggy daycare facilities may provide overnight boarding, grooming, and bathing services. Doggy daycare facilities may also track dates of when dogs are due for shots to help ensure that fewer diseases are spread among the boarded dogs. Medical services are provided separately by veterinarians at veterinary care facilities, and not at the doggy daycare facility.

Thus, conventional facilities do not provide complete care. Also, while some very small scale boarding operations offer pickup services via vans or short buses, dog owners are generally required to pick up and drop off dogs themselves, and there is no such service for larger venues (e.g., places of employment, rail stations, club houses of large housing developments, etc.). Furthermore, animal custody is not maintained from one location in a daycare facility to another. Accordingly, an improved animal transportation and care system may be beneficial.

SUMMARY

Certain embodiments of the present invention may be implemented and provide solutions to the problems and needs in the art that have not yet been fully solved by conventional animal transportation, boarding, and care services and facilities. For example, some embodiments of the present invention are directed to an end-to-end animal care solution that provides transportation and care services for animals. For instance, some embodiments may provide transportation of an animal to/from a pickup/dropoff location, provide grooming services, daycare services, boarding services, training services, spa services, and/or veterinary services.

In one embodiment, a computer-implemented method includes receiving, by a computing system, information from at least one scanner of a plurality of scanners indicating that an animal has been scanned as being picked up from a first pickup/dropoff location by a bus, and updating the location of the animal in a database as on the bus. For instance, in some embodiments, a kennel that the animal is located in on the bus and/or which area the dog will go to at the ranch facility may be recorded. The computer-implemented method also includes receiving, by the computing system, information from the at least one scanner of the plurality of scanners indicating that the animal has been transferred to an area of a ranch, and updating the location of the animal in the database as in the area. The computer-implemented method further includes receiving, by the computing system, information from the at least one scanner of the plurality of scanners indicating that the animal has been scanned as being picked up by the bus from the ranch, and updating the location of the animal in the database as on the bus. Additionally, the computer-implemented method includes receiving, by the computing system, information from the at least one scanner of the plurality of scanners indicating that then animal has been scanned as being picked up from the first pickup/dropoff location or a second pickup/dropoff location by an authorized individual, and updating the location of the animal in the database as no longer in custody.

In another embodiment, a computer program is embodied on one or more non-transitory computer-readable media. The computer program is configured to cause at least one processor to dispatch a bus to a first pickup/dropoff location, a second pickup/dropoff location, or both, and determine whether one or more of an animal's vaccinations, a yearly checkup, or both, are overdue. When one or more of the animal's vaccinations, the yearly checkup, or both, are overdue, the computer program is configured to cause the at least one processor to provide an indication that the animal's vaccinations, a yearly checkup, or both, are overdue. When the animal's vaccinations, the yearly checkup, or both, are not overdue, the computer program is configured to cause the at least one processor to receive information from at least one scanner of a plurality of scanners indicating that the animal has been scanned as being picked up from the first pickup/dropoff location by a bus, and update the location of the animal in a database as on the bus. The computer program is also configured to cause the at least one processor to receive information from the at least one scanner of the plurality of scanners indicating that the animal has been transferred to an area of a ranch, and update the location of the animal in the database as in the area. The computer program is further configured to cause the at least one processor to receive information from the at least one scanner of the plurality of scanners indicating that the animal has been scanned as being picked up by the bus from the ranch, and update the location of the animal in the database as on the bus. Additionally, the computer program is configured to cause the at least one processor to receive information from the at least one scanner of the plurality of scanners indicating that then animal has been scanned as being picked up from the first pickup/dropoff location or the second pickup/dropoff location by an authorized individual, and update the location of the animal in the database as no longer in custody.

In yet another embodiment, a system includes memory storing executable instructions and at least one processor operably connected to the memory and configured to execute the executable instructions. The at least one processor is configured to receive information from at least one scanner of a plurality of scanners indicating that an animal has been scanned as being picked up from a first pickup/dropoff location by a bus and a first kennel to which the animal is assigned, update the location of the animal in a database as on the bus, and store the assigned kennel. The at least one processor is also configured to receive information from the at least one scanner of the plurality of scanners indicating that the animal has been transferred to an area of a ranch, update the location of the animal in the database as in the area, and unassign the assigned kennel. The at least one processor is further configured to receive information from the at least one scanner of the plurality of scanners indicating that the animal has been scanned as being picked up by the bus from the ranch and a second kennel to which the animal is assigned, update the location of the animal in the database as on the bus, and store the assigned kennel. Additionally, the at least one processor is configured to receive information from the at least one scanner of the plurality of scanners indicating that then animal has been scanned as being picked up from the first pickup/dropoff location or a second pickup/dropoff location by an authorized individual, update the location of the animal in the database as no longer in custody, and unassign the assigned kennel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6A is a side view of a bus with kennels, according to an embodiment of the present invention.

FIG. 6B is a side view of the bus with a series of racks, according to an embodiment of the present invention.

FIG. 6C is a side view of a portion of a rack, according to an embodiment of the present invention.

FIG. 6D is a side view illustrating a shelf system, according to an embodiment of the present invention.

FIG. 6E is a side view illustrating a shelf system with a drainage system, according to an embodiment of the present invention.

FIG. 12 is a screenshot illustrating a medical information page, according to an embodiment of the present invention.

FIG. 14 is a screenshot illustrating a services scheduling page, according to an embodiment of the present invention.

FIG. 18 is a screenshot illustrating a camera registration page, according to an embodiment of the present invention.

DETAILED DESCRIPTION OF THE EMBODIMENTS

Some embodiments of the present invention are directed to an end-to-end animal care solution that provides transportation and care services for animals. For instance, some embodiments may provide transportation of animals to/from a pickup/dropoff location, grooming services, daycare services, boarding services, training services, spa services, and/or veterinary services. The model may be most lucrative for dogs, but services may be provided for other animals as well in some embodiments, and a single facility may provide services for a single type of animal, or for multiple types of animals, without deviating from the scope of the invention.

Daycare, grooming, healthcare, boarding, spa, and training services may be provided by one or more suitable facilities (hereinafter "ranches" or "ranch facilities") serviced by one or more transportation vehicles configured for animal transportation (e.g., buses, vans, trucks, cars, SUVs, etc.—hereinafter "buses"). The buses may be specially configured for scanning, kenneling, and transporting pets. This provides added convenience for owners, who only need to take their pet to a local pickup/dropoff location, such as a certain location in a neighborhood, a place of business, or any other suitable location. In certain embodiments, pickup locations and dropoff locations may differ, or users may schedule to drop a pet off at one location and pick the pet up at another location based on their personal schedule.

In certain embodiments, buses may also pickup/dropoff animals at local shelters to provide a better quality of life for shelter animals. In some embodiments, pets may be picked up directly from the owner's home. This may be a service provided for an increased fee in concert with pickup/dropoff locations in some embodiments. Embodiments provide an easy and safe way for owners to give their pets a healthy, pleasant, and engaging experience without having to drive their pets to the actual pet care location.

Figure 1:
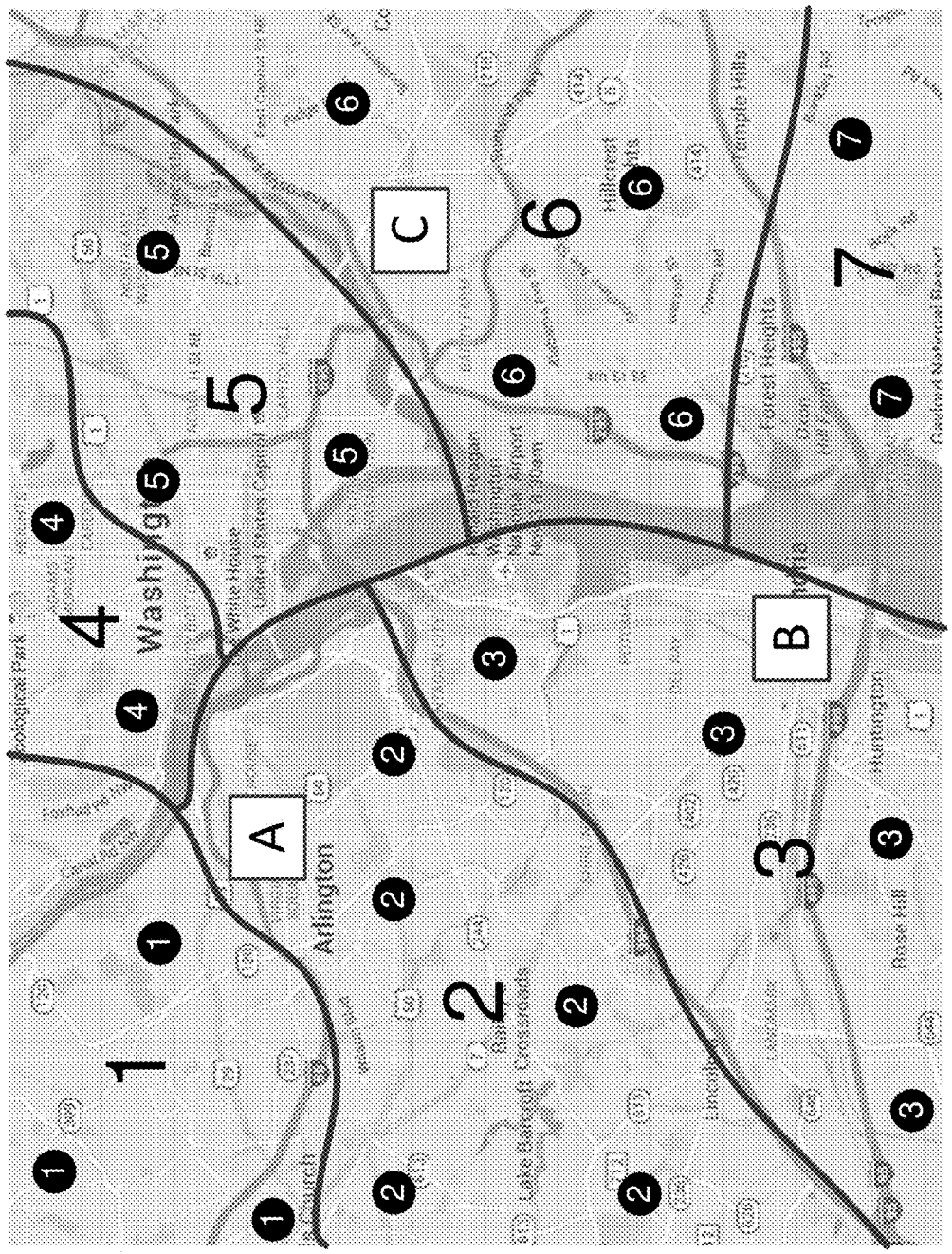
FIG. 1 is a map illustrating bus zones, pickup locations, and ranch facilities, according to an embodiment of the present invention.

FIG. 1 is a map 100 illustrating bus zones, pickup locations, and ranch facilities, according to an embodiment of the present invention. In FIG. 1, an arbitrary map from Google Maps™ has been used for illustration purposes only as to how bus zones, pickup locations, and ranch facilities may be located and serviced. Naturally, embodiments need not be solely limited to the Washington, D.C. area or any other specific geographic area. Such a view may be present in a software application for bus drivers that utilizes Google Maps™ or any other suitable mapping technology so they can view pickup locations and ranch locations, as well as ensure that they are not picking up animals outside of their zone. In FIG. 1, seven zones numbered 1-7 are shown, each serviced by a different bus or other pet transportation vehicle. Each zone has respective pickup/dropoff locations labeled by black circles including the respective zone number. In certain embodiments, each bus may stop only once.

Ranch facilities are illustrated as white squares labeled A-C. Each ranch facility may provide services for multiple zones. For instance, buses from zones 1, 2, and 4 may transport animals to/from ranch A, buses from zones 3 and 7 may transport animals to/from ranch B, and buses from zones 5 and 6 may transport animals to/from ranch C. In certain embodiments, multiple buses may service a single zone, or a single bus may take animals to multiple ranches.

Ranch Facilities

Ranch facilities may provide a positive "day camp/adventure center" atmosphere for pets, providing them with a healthy and fulfilling experience. Each ranch facility may have multiple indoor and/or outdoor areas where animals can play, run agility courses, receive veterinary care, be groomed, be boarded, etc. Outdoor areas may be fenced in to allow animals, such as dogs, to run and play within unleashed. Animals may be supervised in each area at all times ensure safety. In some embodiments, 200-500 dogs per day may be managed, although smaller or larger numbers may be accommodated without deviating from the scope of the invention.

Each ranch facility may feature a modular pasture design including multiple pasture areas where modular fencing is used to reconfigure the pasture designs each day, or as desired, to meet the needs of the dog demographic that will be cared for that day or other time period. For instance, sizes may be reduced for a larger number of small dogs or older, less active dogs, for example. Also, a larger number of high energy dogs may make increasing the size beneficial, and less sociable dogs may be put into smaller groups or isolated entirely. This allows optimization of the space that is used and increases profitability. Areas stored in the computing system for that ranch facility may be reconfigured, cameras may be repositioned, sensors may be moved, etc. to ensure that the online representation of these outdoor pasture areas matches the actual physical layout. Similarly, indoor play areas may have reconfigurable barriers in some embodiments, enabling similar customization. In some embodiments, a double gating system is used to ensure the safety of the animals.

Figure 2:
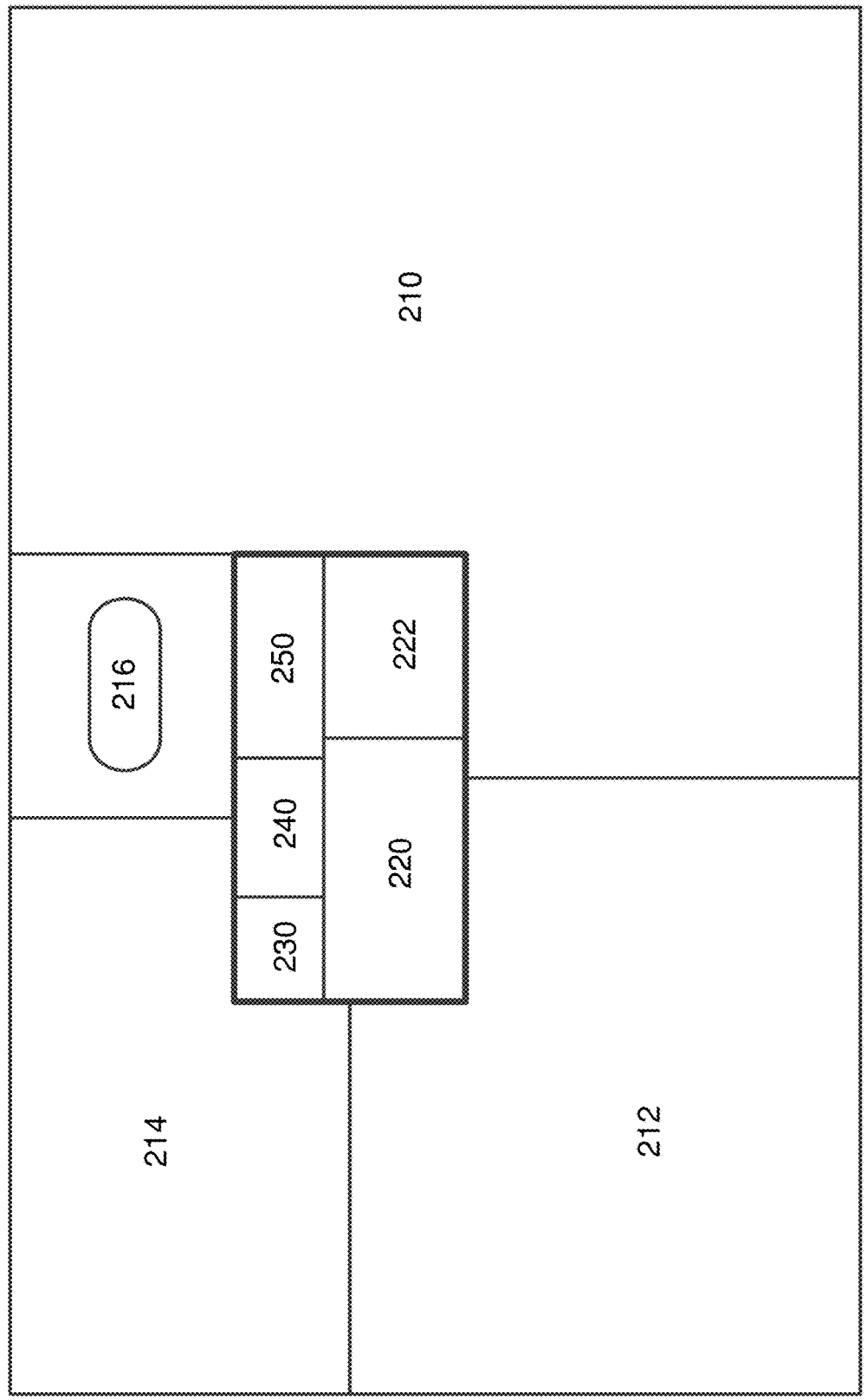
FIG. 2 is a block diagram illustrating a ranch facility, according to an embodiment of the present invention.

FIG. 2 is a block diagram illustrating a ranch facility 200, according to an embodiment of the present invention. In this embodiment, three outdoor areas 210, 212, 214, 216 and five indoor areas 220, 222, 230, 240, 250 are shown. However, any number and/or configuration of areas may be provided without deviating from the scope of the invention. Furthermore, some ranch facilities may not provide all of the areas and/or services discussed with respect to FIG. 2, or may provide additional areas and/or services.

In ranch 200, two outdoor play areas 210, 212 are provided. For instance, higher energy animals may be placed within larger area 210 while lower energy animals may be placed in smaller area 212. An agility/training area 214 is provided so animals can receive obedience training, run obstacle/agility courses, etc. A pool 216 allows dogs that enjoy the water to take a dip, or for dogs to cool off on hot days. In some embodiments, pool 216 may be covered or be located indoors.

Two indoor play areas 220, 222 are also provided. Similar to outdoor play areas 210, 212, indoor play areas 220, 222 may contain the higher energy and lower energy animals, respectively. A veterinary care area 230 provides care for animals as requested by owners, if animals require care while in the custody of the ranch, or both. Ranch 200 may staff its own veterinarian, or veterinarians from other veterinary facilities may be obtained during certain hours on some or all days on a contract basis.

A grooming area 240 is provided where animals can be bathed and/or groomed as desired by the owners, or if animals become dirty while at ranch 200. A boarding area 250 is provided where animals may spend multiple days at ranch 200. Animals may be boarded together in an open area, contained within individual kennels, or a combination thereof. Custody of the animals in each area is maintained by staff and/or scanning equipment (e.g., a scanner, cell phones running a software application, etc.) that discerns a unique identifier (ID) for each animal. Also, one or more areas may have cameras in some embodiments. These cameras may be fixed with a relatively wide field-of-view (FOV) or pan back and forth automatically in some embodiments. In certain embodiments, an owner may login to a website or another software application, determine which room his or her pet(s) are in, and choose to view the room with one or more of the pet(s). In certain embodiments, users may register to access one or more cameras in the room(s) with their pets for a predetermined period of time and control the one or more cameras to follow their pet.

In some embodiments, ranch facilities are largely or entirely open air facilities. In certain embodiments, a shelter (e.g., a canopy, tent, pavilion, etc.) may be provided to shelter dogs from rain, sun, and heat. In such embodiments, buses may remain onsite to provide safe and suitable shelter in the event that the weather is poor (e.g., severe heat, heavy rain, thunderstorms, etc.). In other words, dogs may be loaded back into kennels on the bus to wait out the weather. In the event of extremely dangerous weather conditions (e.g., tornadoes, derechos, flash flooding, etc.), dogs may be transported away from the ranch facility to a safer location until the threat passes.

Figure 3:
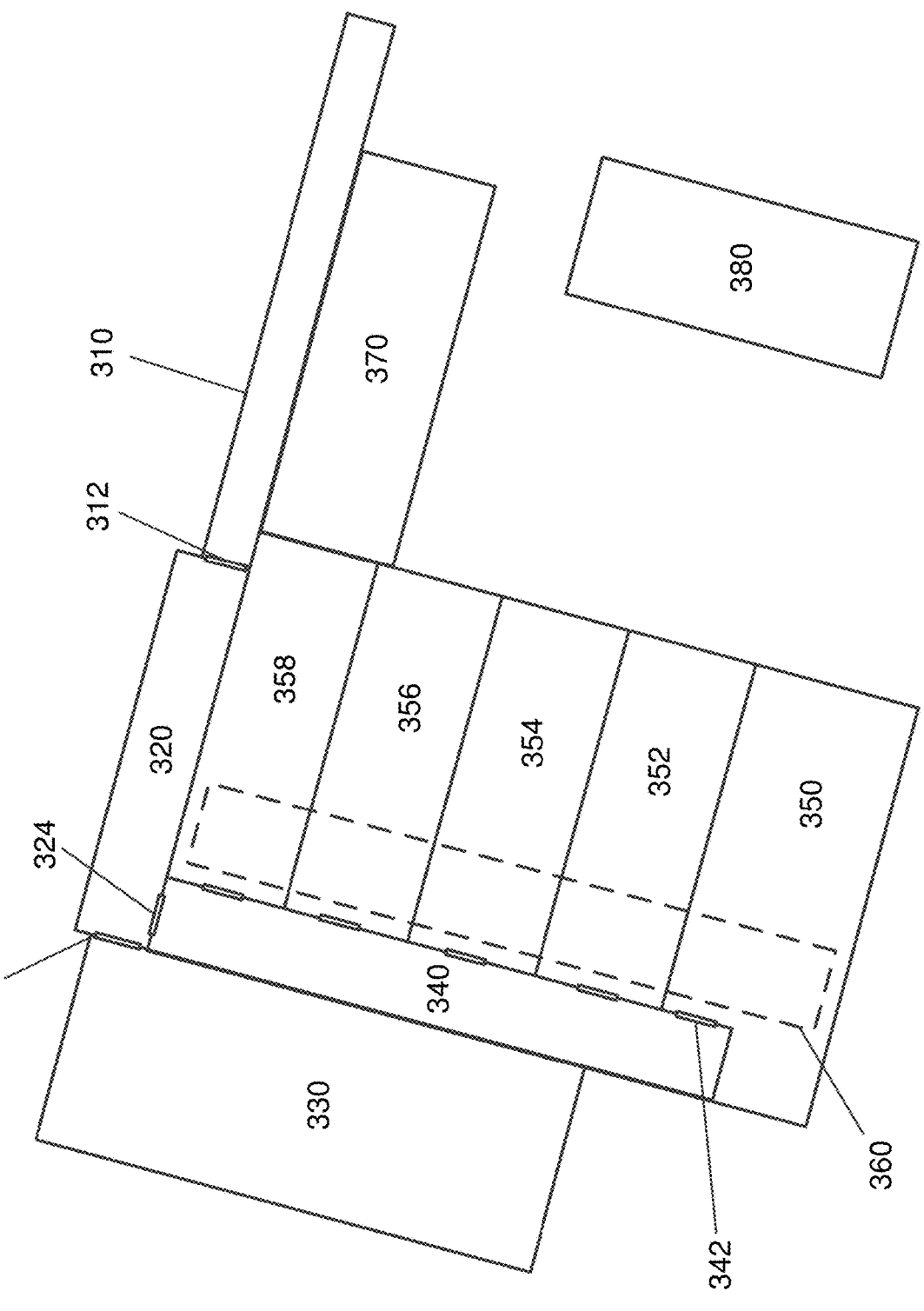
FIG. 3 is a block diagram illustrating another ranch facility, according to an embodiment of the present invention.

FIG. 3 is a block diagram illustrating another ranch facility 300, according to an embodiment of the present invention. Ranch facility 300 includes a driveway 310 that provides access to buses and other vehicles. A parking lot 370 provides parking for staff and visitors. An unloading area access gate 312 provides access to a bus unloading area 320.

Bus unloading area 320 provides a location for the bus to safely load/unload animals Bus unloading area 320 may be fenced in so animals are safely contained during loading/unloading. Buses may access a bus parking lot via a bus gate 322 and animals may access a pasture area access walkway 340 via a walkway access gate 324.

Animals may be lead down pasture access walkway 340 to a desired pasture area 350, 352, 354, 356, 358, which is accessed via a respective pasture access gate 342. A shelter 360, such as a canopy, a tent, or any other suitable structure, extends across a portion of pasture areas 350, 352, 354, 356, 358 in this embodiment. However, in some embodiments, shelter 360 may only cover a subset of pasture areas 350, 352, 354, 356, 358, may have a different shape (e.g., "L" shaped) and/or orientation, may be configurable to have a desired shape, etc.

In this embodiment, a building 380 provides a location for performing various animal services, such as veterinary care, spa services, grooming, boarding, etc. However in some embodiments, no building may be present, and ranch facility 300 may be an outdoor-only facility. Various services may be provided outside, or perhaps daycare and/or boarding only would be provided in some embodiments.

In some embodiments, boarded animals may be kept outside overnight in pasture areas 350, 352, 354, 356, 358 if the weather is suitable. In certain embodiments, one or more buses may return to ranch facility 300 after dropping off animals that were enrolled in daycare services for that day, and animals to be boarded may be loaded into respective kennels to sleep. Boarded animals may then be unloaded in the morning before the bus departs to collect daycare animals.

Figure 4:
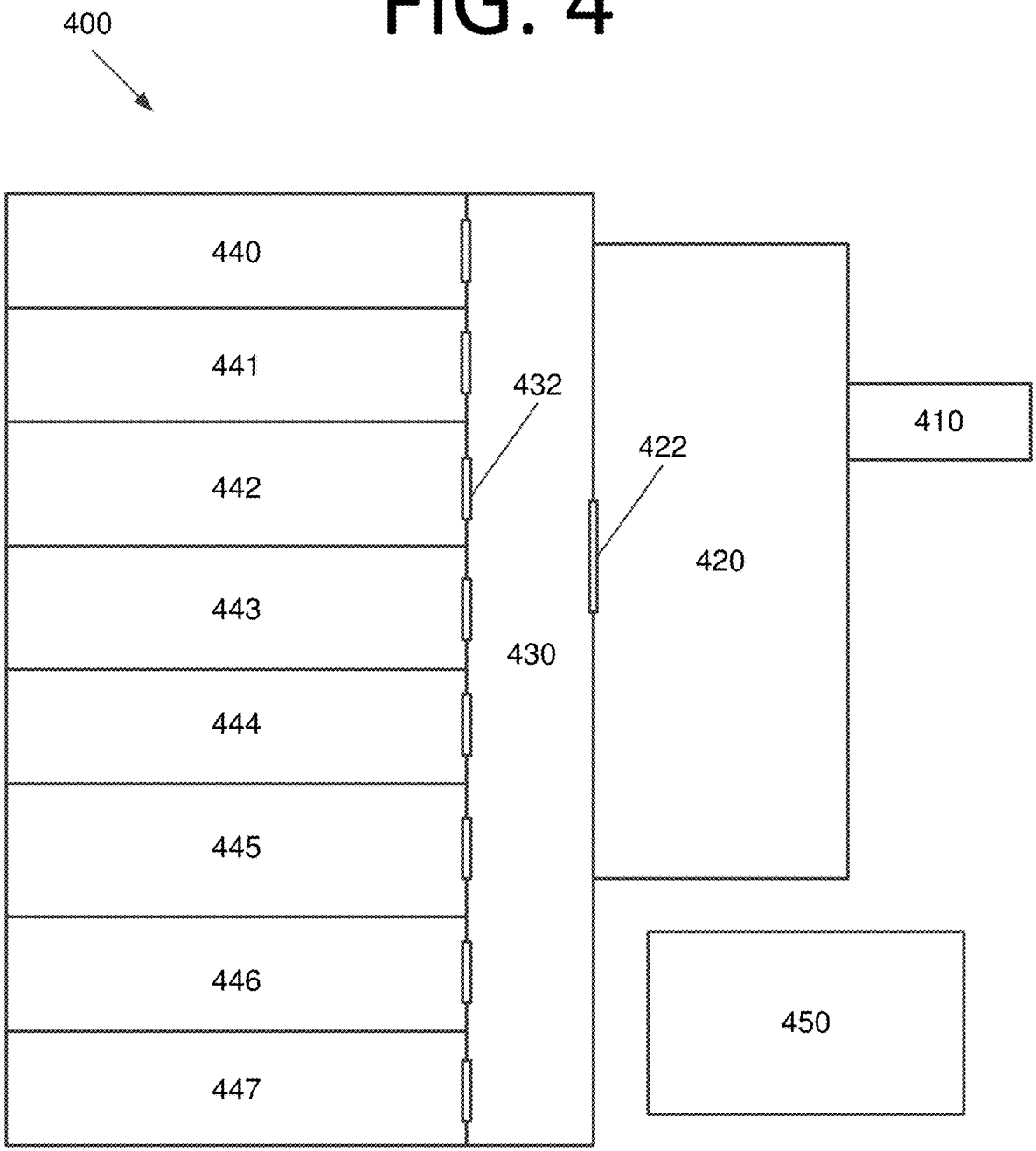
FIG. 4 is a block diagram is a block diagram illustrating yet another ranch facility, according to an embodiment of the present invention.

FIG. 4 is a block diagram is a block diagram illustrating yet another ranch facility 400, according to an embodiment of the present invention. A driveway 410 provides access to a parking lot 420 that may be used by buses, staff, and visitors. Buses may access unloading area 430 via unloading area access gate 422. In this embodiment, bus unloading area 430 serves as both a place to load/unload dogs and a walkway to transport dogs between any of pasture areas 440-447, which are accessed via respective pasture gates 432. Once all animals have been unloaded, buses may leave unloading areas 430, and animals may be safely transferred from one pasture area to another. A building 450 provides a location for performing various animal services, such as veterinary care, spa services, grooming, boarding, etc.

Figure 5:
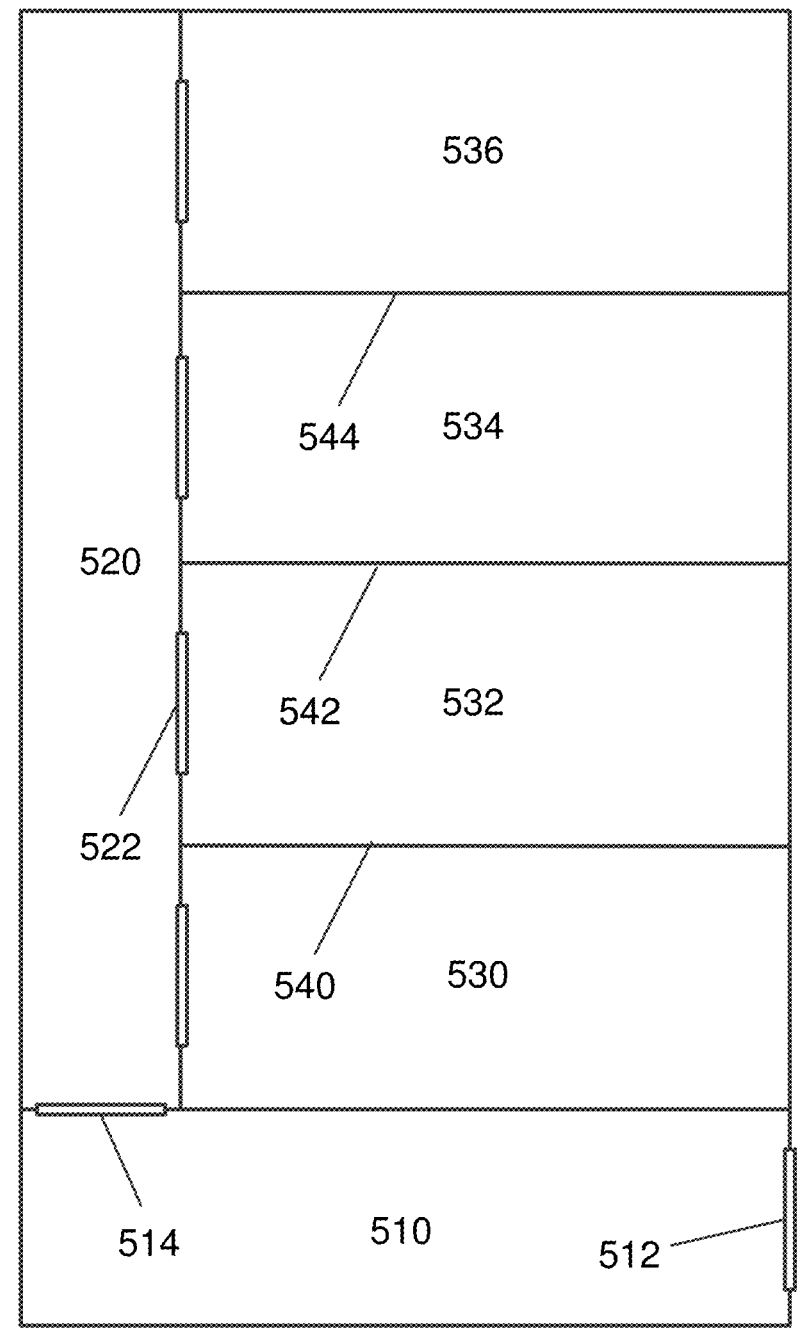
FIG. 5 is a block diagram illustrating a layout of a modular pasture, according to an embodiment of the present invention.

FIG. 5 is a block diagram illustrating a layout of a modular pasture 500, according to an embodiment of the present invention. An unloading area is accessed via gate 512, and animals can be moved into pasture access area 520. Respective gates 522 allow animals to be moved into each pasture access area 530, 532, 534, 536. Configurable barriers 540, 542, 544 (e.g., movable fences, barriers, blocks, etc.) between pasture access areas 530, 532, 534, 536 may be moved to change the sizes of adjacent pasture access areas.

As with ranch facility 200 of FIG. 2, each ranch facility 300, 400, 500 in FIGS. 3-5 may have sensors and cameras to track dog locations. Furthermore, animals may be scanned as they are moved from one area to another and a database may be updated so the precise animal location may be tracked. A web browser or another software application (personal computer, mobile, tablet, etc.) may enable a user to view animals in the areas via cameras.

Buses

In some embodiments, buses transport animals to/from the ranches. Each bus may contain any desired number of kennels (e.g., 60 kennels in some embodiments) that fit within the bus and facilitate safe travel for the animals contained therein. For instance, old school buses may be retrofitted to have all of their seats removed and have kennels/racks installed. The kennels may have different sizes to accommodate various animals (e.g., a pug versus a mastiff). Kennels (e.g., crates, cages, etc.) may be permanently or removably affixed to the floor and/or sides of the inside of the bus. A removable configuration may facilitate easier cleaning and/or changing kennel sizes. "Racks" may be installed on the bus such that the kennels may be affixed thereto.

FIG. 6A is a side view of a bus 600 with kennels 630, according to an embodiment of the present invention. In this embodiment, as animals enter bus 600 via a door 610, a scanner 620 generates a signal that causes a passive RFID tag on the animal to transmit its ID, which is received by scanner 620. In some embodiments, scanner 620 may have internal components similar to computing system 2400 of FIG. 24, or at least a subset thereof (e.g., a processor, a communication device, and memory). Scanner 620 may then transmit to a central server that the animal has been picked up by bus 600. Similarly, scanner 620 may record when the animal leaves bus 620. Alternatively, scanner 620 may transmit to a cell phone of the bus driver or another computing system on bus 600, which then relays the information onward to the central server. In certain embodiments, in lieu of a fixed scanner on bus 600, the bus driver may use a handheld scanner or cell phone. "Central server" may refer to a single computing system, distributed computing systems, cloud computing systems, an Enterprise Resource Planning (ERP) system, or any other suitable computing system(s) or combination thereof.

When an animal is scanned in the morning, the driver may verify that the correct day is reserved, the correct person is dropping the animal off, the animal is fit to board the bus from a health perspective, etc. Scanner 620, the driver's cell phone, etc. may display this information. If the animal is not scheduled for service that day, if space is available on the bus and at the ranch facility, the owner may confirm with the bus driver that service is desired and the bus driver may enter this into the central server via a cell phone, a bus computing system, or any other suitable computing system.

Kennels 630 have different sizes in this embodiment, and may come in any arrangement of sizes and configurations in some embodiments (or perhaps all kennels may be the same size). In this embodiment, kennels 630 come in a smaller size 632, an intermediate size 634, and a larger size 636. Each kennel may have its own transmitter, which detects a passive RFID tag associated with the animal housed therein and transmits this information to the central server either itself or relays the information to another computing system (e.g., a computing system on the bus, the driver's cell phone, etc.). The bus driver may record each animal in a respective kennel with the central server.

FIG. 6B is a side view of the bus with a series of horizontal racks 640, according to an embodiment of the present invention. In some embodiments, the racks may be vertical, at an angle, nonlinear, single individual attachment points on the bus, or in any other configuration or combination of configurations without deviating from the scope of the invention. Racks 640 hold kennels 630 in place with respect to a side of bus 600 in this embodiment, and to the floor of the bus in FIG. 6D. Racks 640 may allow kennels of different sizes to be affixed to various locations on racks 640.

FIG. 6C is a side view illustrating a portion of a rack 640, according to an embodiment of the present invention. Each rack 640 includes connection mechanisms 642 that enable the kennels to be affixed thereto. Connection mechanisms 642 may include, but are not limited to, notches, holes, slits, locks, rods, fasteners, or any other suitable connection mechanism or combination thereof. Each kennel would have corresponding connectors that are configured to engage with connection mechanisms 642 and hold the kennel in place.

In some embodiments, racks may be attached to the floor of the bus and kennels may be attached to a system of shelves that are attached to the racks. FIG. 6D is a side view illustrating a shelf system 650, according to an embodiment of the present invention. Racks 640 are attached to a floor 660 of bus 600 and a horizontal shelf 652 of shelf system 650. Vertical supports 654 support upper shelves 652 of shelf system 650. In this embodiment, large kennels 636 are fastened to horizontal shelves 652. However, at least some kennels may be next to each other in some embodiments and may be fastened to one another and/or to a side of bus 600 for further stability and support. Also, kennels may be of any size, configuration, or mix of sizes and configurations. In some embodiments, shelf system 650 may also be attached to a side of the bus for further stability and support.

In some embodiments, a flushing and drainage system may be included. FIG. 6E is a side view illustrating shelf system 650 with a drainage system 670, according to an embodiment of the present invention. In FIG. 6E, only the lower two shelves are shown and the middle shelf and supports are separated for ease of illustration.

In some embodiments, trays 672 may be included below each row of kennels. Trays 672 may be at a slight angle to facilitate better flow of water, waste, and cleaner from tray 672 to gutters 674. Gutters 674 may also be at an angle to facilitate flow. Water, waste, and cleaner then flow through gutters 674 and out floor 660 of bus 600 via downspouts 676, which may exit bus 600 via holes in floor 660. A bus driver or other staff member may clean the kennels using disinfectant cleaner and a hose or portable water source.

Figure 6F:
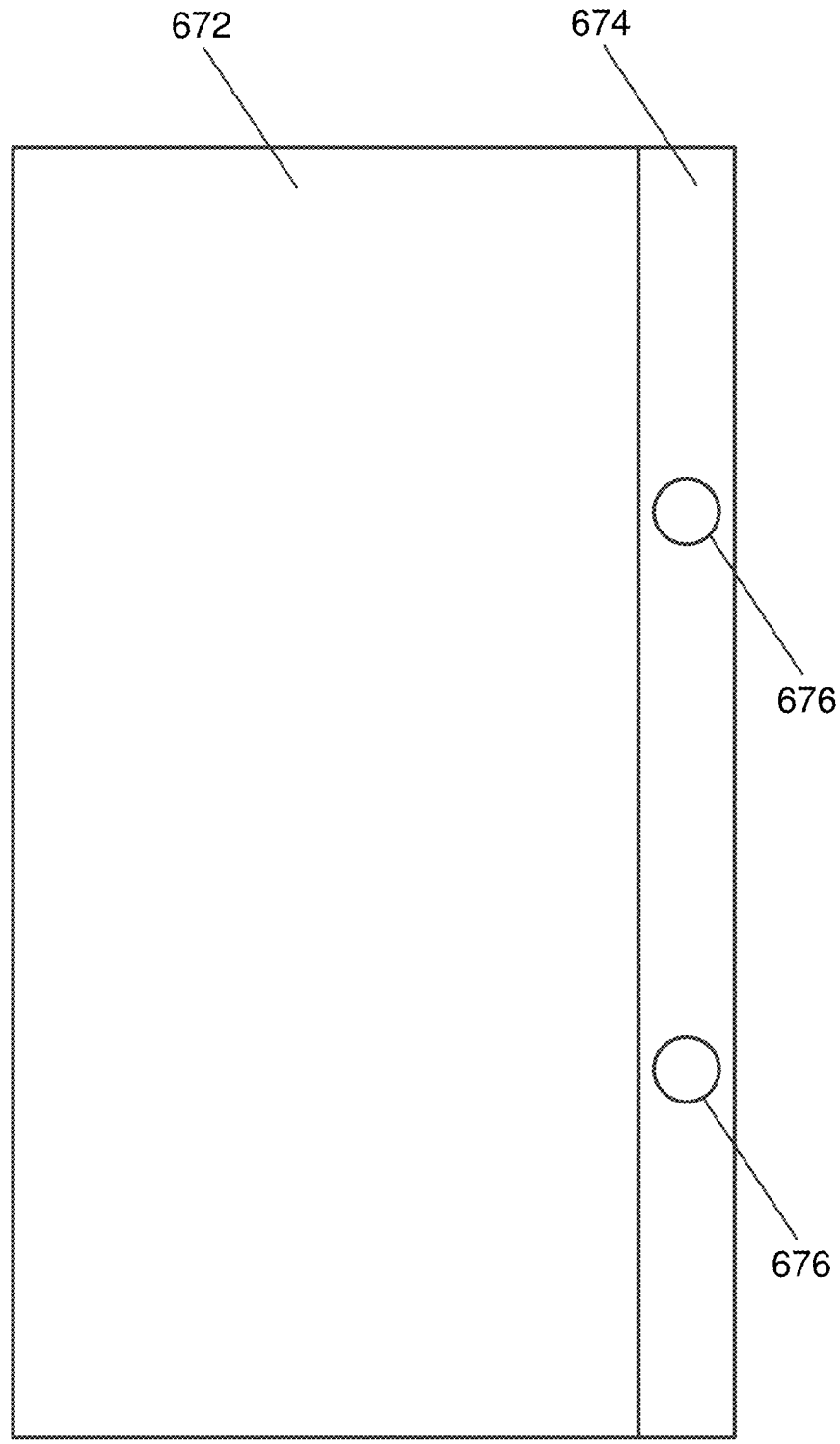
FIG. 6F is a top view illustrating a tray of the drainage system, according to an embodiment of the present invention.

FIG. 6F is a top view illustrating a tray 672 of drainage system 670, according to an embodiment of the present invention. Tray 672 empties into gutter 674, which has an open top in this embodiment. In this embodiment, tray 672 slopes into gutter 674, but in other embodiments, pipes, tubes, openings, etc. may empty into gutter 674 along a portion of its length. In certain embodiments, gutter 674 may have a closed top and be in the shape of a tube. However, an open architecture for gutter 674 and tray 672 may facilitate easier cleaning. Water, waste, and cleaner exit gutter 674 via downspouts 676.

Kennels

Figure 7A:
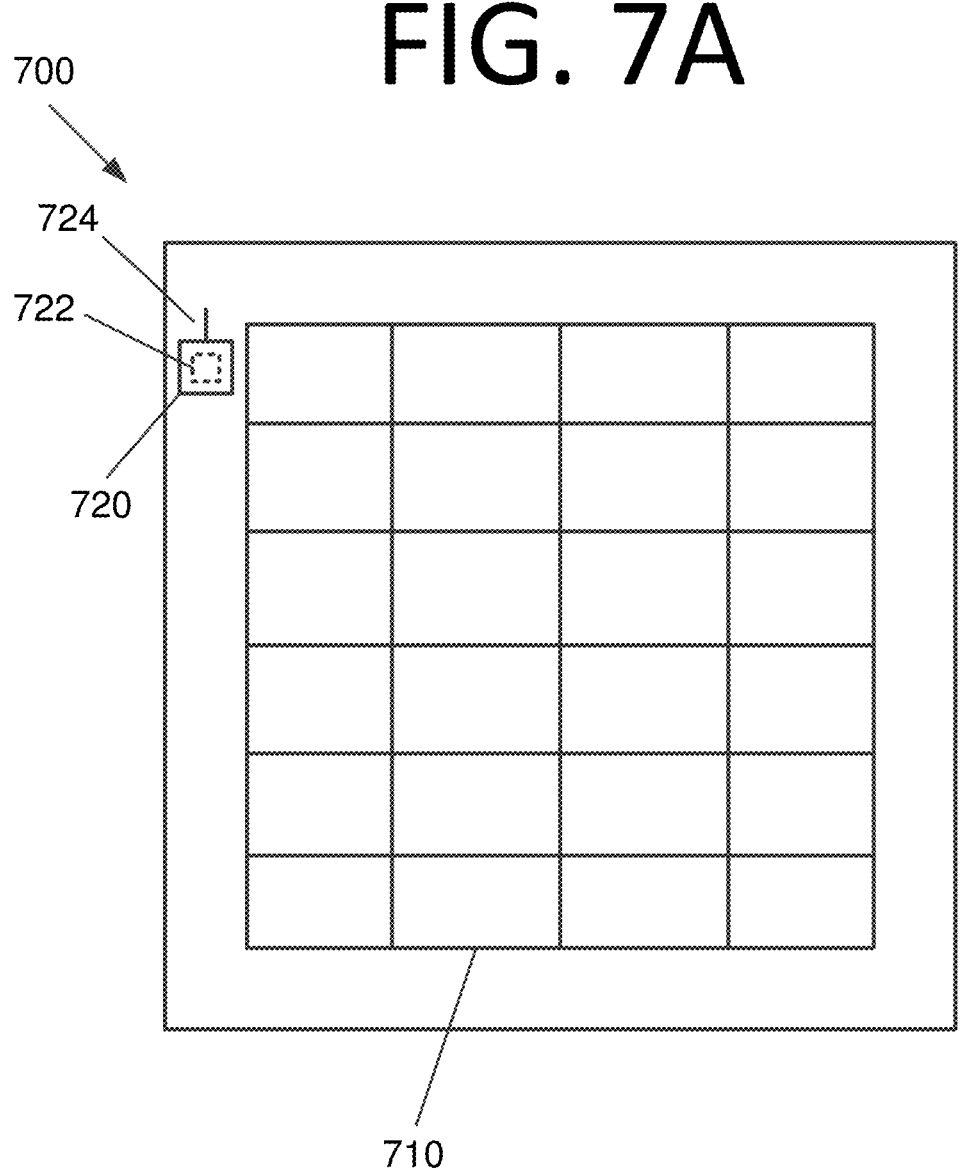
FIG. 7A is a front view of a kennel, according to an embodiment of the present invention.

As discussed above, each bus may include kennels for safely transporting individual animals to/from the ranches. FIG. 7A is a front view of a kennel 700, according to an embodiment of the present invention. Kennel 700 includes a door 710 to animals can be placed within/removed from kennel 700. In some embodiments, the interior of kennel 700 may be padded (not shown) for the animal's comfort. In certain embodiments, a removable liner or tray (not shown) may be included in kennel 700 that can be removed and cleaned if an animal urinates or defecates therein.

Figure 7B:
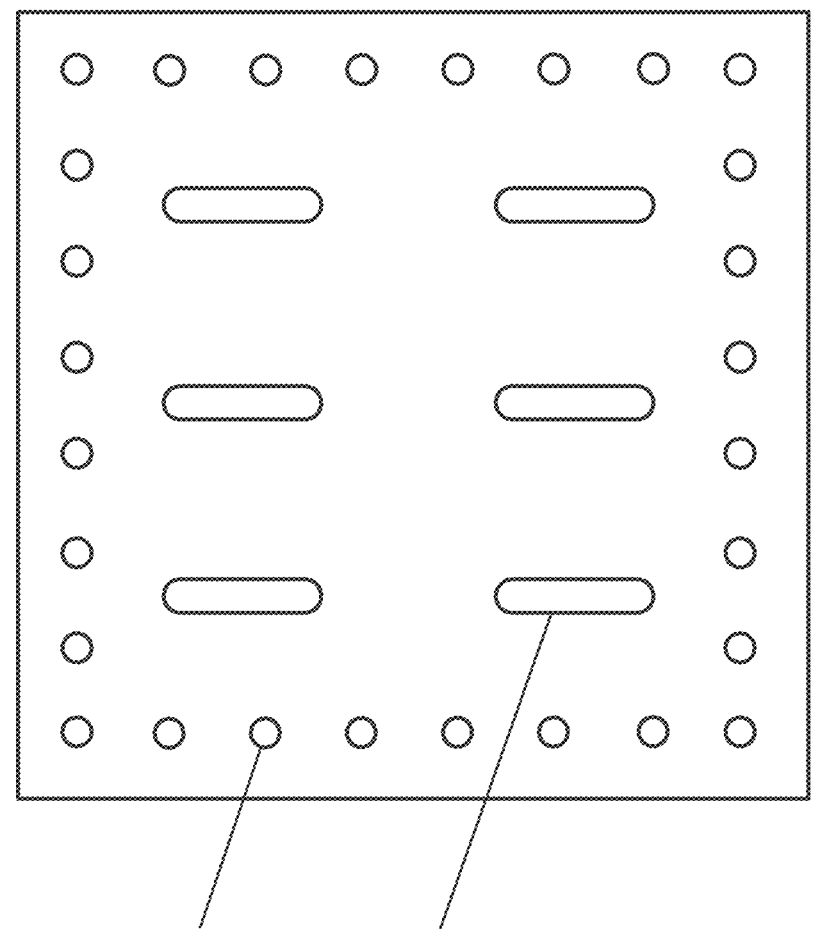
FIG. 7B is a bottom view of the kennel, according to an embodiment of the present invention.

A transmitter 720 includes a processor 722 and an antenna 724. Transmitter 720 detects the animal's RFID tag ID and transmits this information to the central server or another computing system. Kennel 700 also includes a plurality of connectors 700 (see FIG. 7B) to affix kennel 700 to one or more racks, to a shelf, to a side of the bus, to another kennel, etc. Connectors 730 may be any suitable type of connector configured to connect connectors 730 to associated connection mechanisms. Furthermore, connectors 730 may be on ay desired side or multiple sides of kennel 700. Drainage holes 740 are located on the bottom of kennel 700 for cleaning purposes.

Scanner

Figure 8A:
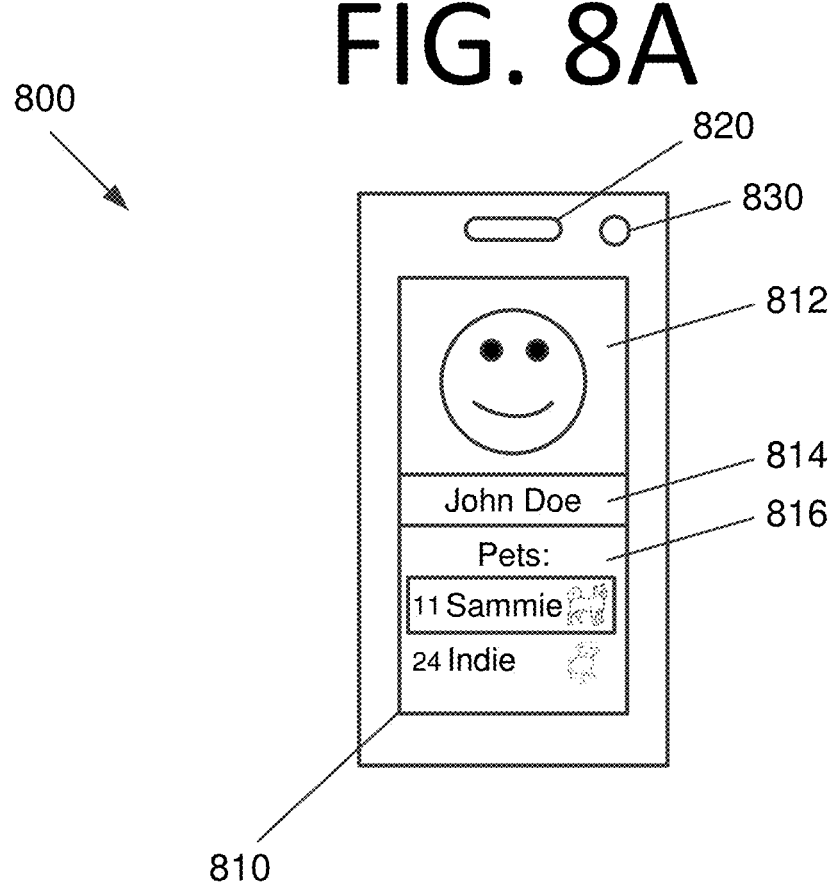
FIG. 8A is a front view of a cell phone, according to an embodiment of the present invention.
Figure 8B:
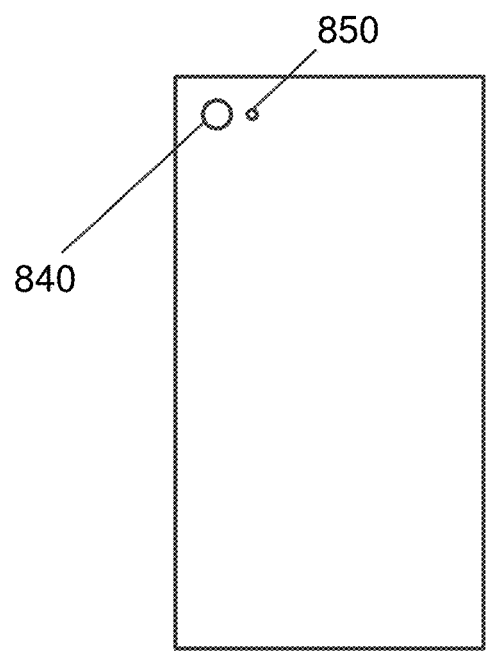
FIG. 8B is a rear view of the cell phone, according to an embodiment of the present invention.

Scanners, such as a proprietary scanner or a cell phone, may be used in some embodiments to track animal location and maintain custody. FIGS. 8A and 8B illustrate front and rear views, respectively, of a cell phone 800, according to an embodiment of the present invention. In this embodiment, cell phone 800 is a smart phone including an application ("app") that facilitates scanning of barcodes, scanning of QR codes, and/or detection of IDs from RFID tags. Cell phone 800 includes a display screen 810 that displays graphics for the app, a speaker 820, two cameras 830, 840, and a flash 850. An image of the owner is shown on area 812 and the name of the owner, John Doe, is displayed in area 814. A listing of John Doe's pets is displayed in area 816, and the currently detected dog, Sammie, is surrounded by a rectangle. Images of the dogs are also shown in this embodiment for easier identification, along with the kennels on the bus to which they are assigned (i.e., kennel 11 for Sammie and kennel 24 for Indie). The kennel number may be assigned on pickup and automatically released upon a release scan during dropoff.

In some embodiments, this information may be displayed when the dog is scanned or photographed, and/or when the owner's face is recognized via facial recognition software in the app, a third party application accessed by the app, or API calls to the operating system of cell phone 800. For instance, a bus driver or staff member may take a photo of the animal or the owner using camera 840. Multiple photos may be stored for the owner and animal in order to facilitate more accurate identification.

Alternatively, an off-the-shelf barcode and/or QR code scanner may be used to scan barcodes and/or QR codes for animals. In such embodiments, the bus driver or staff member would scan the animal upon pickup/dropoff, or upon the animal being moved to an area in a ranch. This information would similarly be transmitted either directly or indirectly (bus driver's cell phone, bus computing system, etc.) to a central server.

Registering and Tracking Animals

Figure 9A:
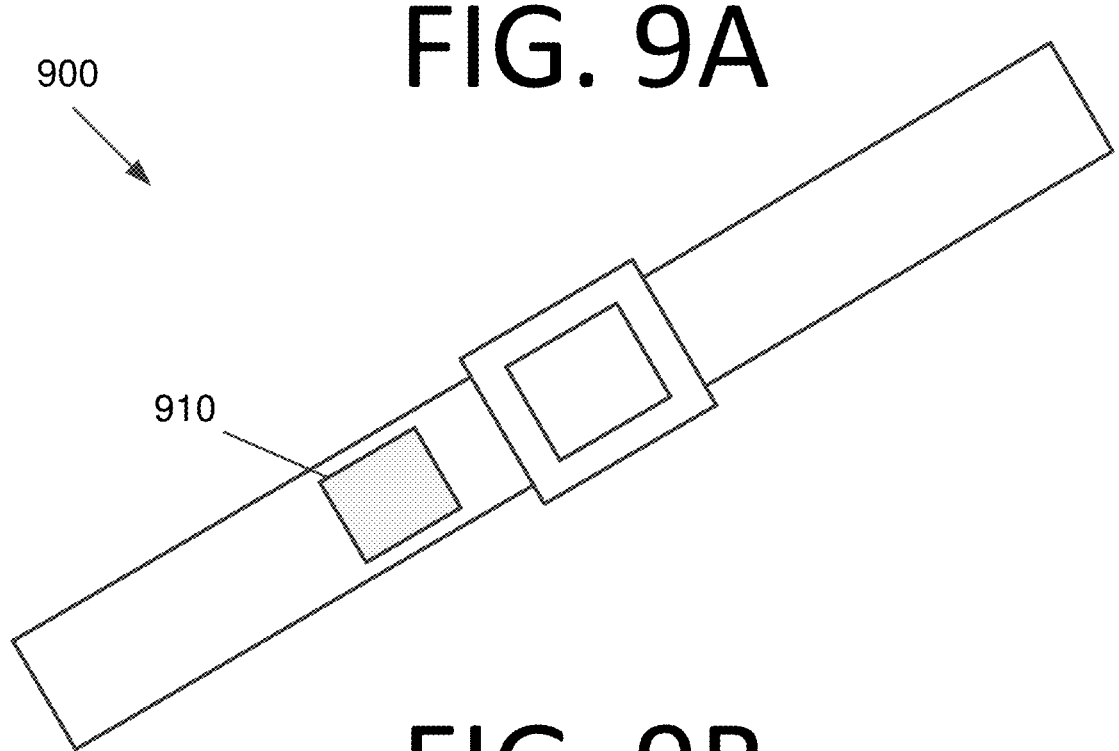
FIG. 9A is a perspective view illustrating a collar with an RFID tag, according to an embodiment of the present invention.
Figure 9B:
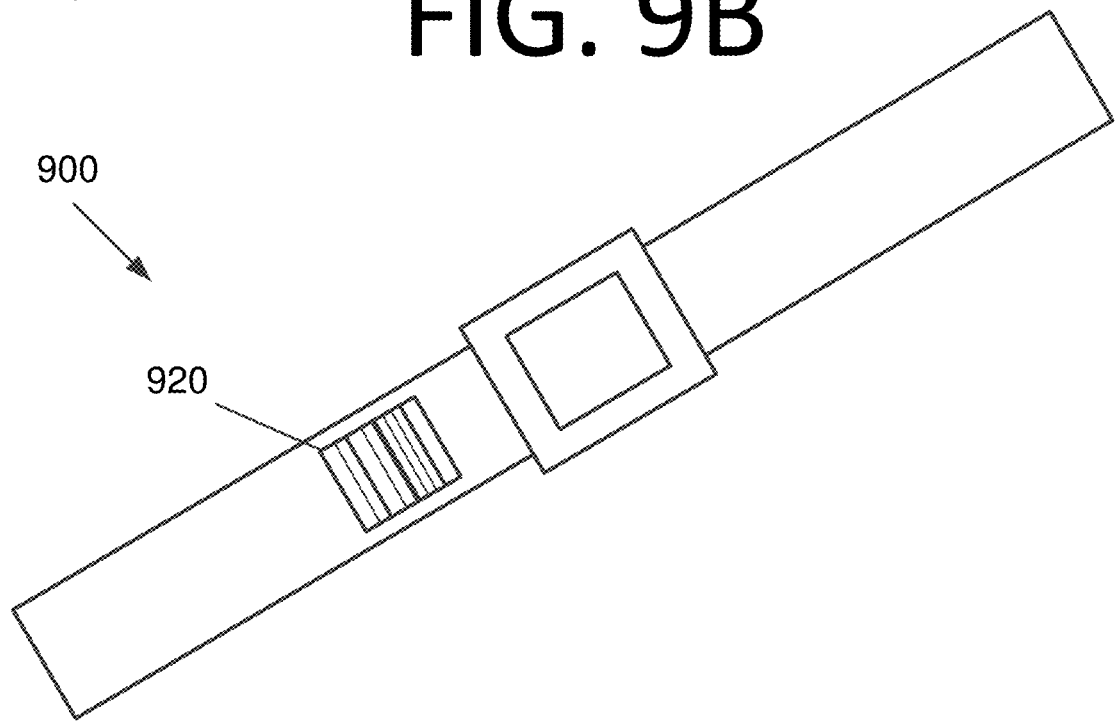
FIG. 9B is a perspective view illustrating a collar with a barcode, according to an embodiment of the present invention.
Figure 10:
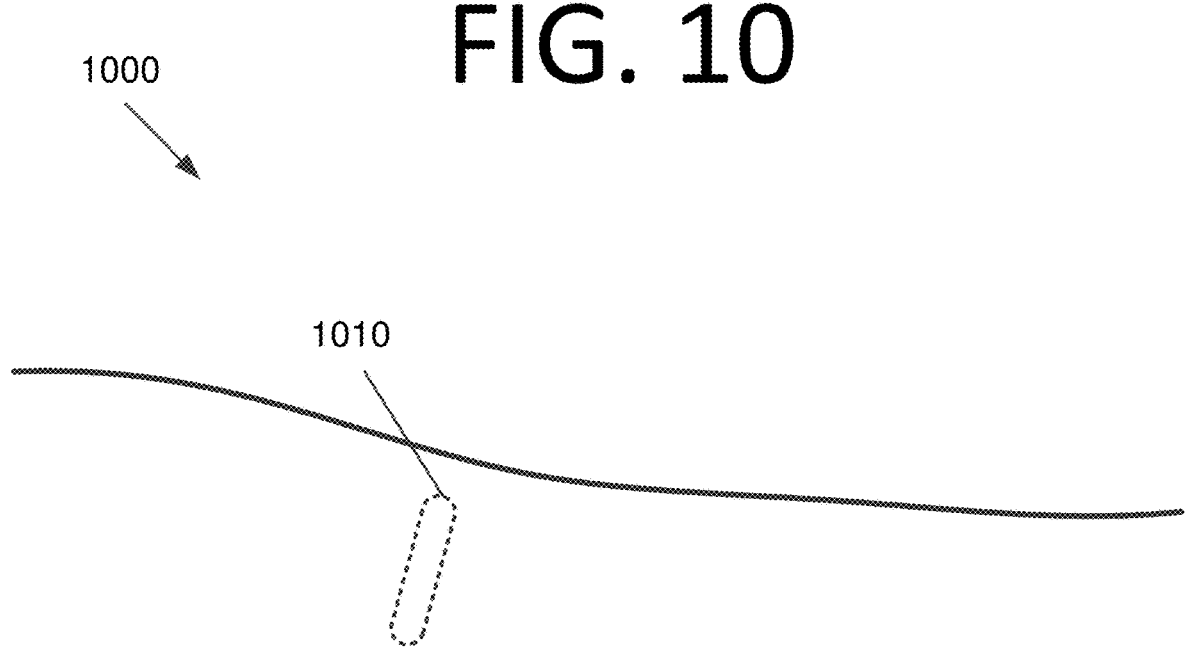
FIG. 10 is a side view illustrating an animal with an embedded microchip, according to an embodiment of the present invention.

Per the above, in order to ensure that animals are picked up at/dropped off from the right place, as well as placed in the correct ranch and areas therein, each animal may be tracked using a unique ID obtained from a barcode, quick response (QR) code, radio frequency identification (RFID) tag, transmitter, microchip, or any other suitable electronic or non-electronic identification mechanism. RFID tags, transmitters, and/or microchips may be embedded within the animal or located externally to the animal via any suitable mechanism. For instance, a collar 900 may include an RFID tag 910, a barcode 920, etc. See FIGS. 9A and 9B. A microchip or other suitable electronic monitoring device 1010 may also be contained within an animal 1000. See FIG. 10. In certain embodiments, the ID tag may hang from the collar or be attached to any other suitable piece of equipment.

When a user registers for service, the user may enter various information pertaining to his/her pets. Registration may be performed via a web application, a software application running on a personal computer, a mobile application, by filling out a form that is manually entered by staff, or by any other suitable mechanism or combination of mechanisms without deviating from the scope of the invention. This information may include, but is not limited to, the name(s) of individuals who are authorized to pick up the animal, the animal's name, dietary restrictions, days service is desired, etc.

Figure 11:
FIG. 11 is a screenshot illustrating a registration page, according to an embodiment of the present invention.

FIG. 11 is a screenshot illustrating a registration page 1100, according to an embodiment of the present invention. Registration page 1100 includes radio button for selecting that the pet type is a cat or dog. However, in some embodiments, services may only be provided for dogs, only for cats, for any individual animal type, or for any combination thereof. The user may enter the pet name and breed, as well as upload an image of the pet that may be used for identification purposes by staff members. Registration page 1100 also includes fields for entering pet weight in pounds, height in inches, and a playgroup code (if known). Any other unit for weight and/or height may be used without deviating from the scope of the invention.

The user may also enter one or more owner names (e.g., comma or semicolon delimited) and upload owner images. These images may be used by bus drivers, for example, to ensure that the individual picking up the animal is authorized to do so. The user may also choose days of the week that service is desired and enter special notes regarding care instructions, dietary restrictions, health conditions, or any other desired information. The user may then submit the registration using the "Submit" button, and validations may be performed to ensure that the information that is entered is free of certain errors (i.e., limiting names to characters only, ensuring that images have been uploaded, performing facial recognition on images to ensure that they are of a person or animal, etc.).

After registration is validated, a computing system, enterprise resource planning system, or any other computing system or systems, may generate a unique ID for the animal that can be used. See, for example, computing system 2400 of FIG. 24. Alternatively, the user may enter a microchip ID during the registration process in some embodiments that may be used to track the animal. The animal's owner(s) may be issued a barcode, RFID, QR code, etc. that may be included on a separate collar or affixed to the animal's existing collar by the owner. This allows bus drivers and ranch staff to maintain custody of the animal from pickup to dropoff.

When a user first registers, medical information for each animal may be required. FIG. 12 is a screenshot illustrating a medical information page 1200, according to an embodiment of the present invention. The user can enter dates for various vaccinations and a last annual checkup date. The system may automatically calculate the date that the next vaccination or checkup is due. For instance, some shots are due every years, some every three years, etc. The user can also enter medications that the animal takes and other miscellaneous medical notes. Also, similar pages may be accessible to the user in order to update pet information, medical information, and/or any other desired information for the user's account.

Animal Custody

Figure 13:
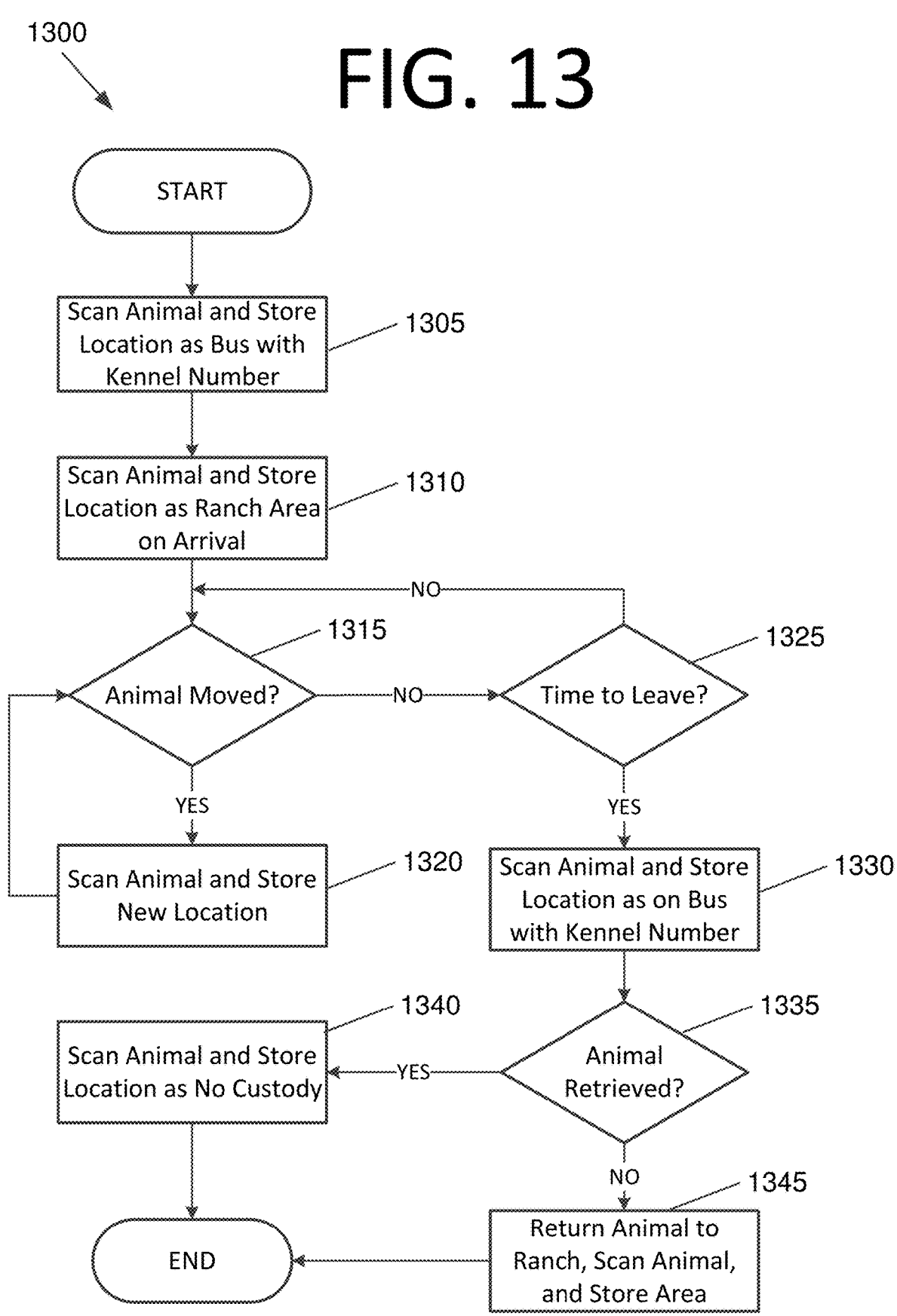
FIG. 13 is a flowchart illustrating a process for tracking animal custody, according to an embodiment of the present invention.

An important feature of some embodiments is the ability to maintain custody by tracking the location of the animal from pickup to dropoff. FIG. 13 is a flowchart 1300 illustrating a process for tracking animal custody, according to an embodiment of the present invention. While the term "scanning" is used in FIG. 13, it should be understood that manual entry of the animal information, automatic detection of an ID via an RFID tag, microchip, or other suitable device, or any other identification mechanism may be used in some embodiments in the context of "scanning" without deviating from the scope of the invention. Prior to arrival at a pickup location, the bus driver may be provided with a list of animals that are to be picked up at that location.

The process begins with scanning the animal, detecting its ID, and saving the status as on the bus, along with the kennel number, to the central server during pickup at 1305. Other information, such as the time of pickup, the estimated time of arrival at the ranch calculated from a mapping tool such as Google Maps™, and/or any other desired information may also be saved to the central server. In some embodiments, the location of the bus may be periodically stored, or stored in real time, on the central server during transit between pickup locations, on the way to the ranch, etc. The user may then login to a website or another software application to see the current location of their pet(s). The website or application may provide its own map functionality or may utilize a third party tool such as Google Maps™ in some embodiments.

In certain embodiments, when the animal is scanned, the animal is identified and a visual identification is displayed on the scanner screen. The system may also verify that the location is the correct location for that animal, and what services are scheduled. If no services are scheduled, the owner may purchase services for the day via the scanner or his or her mobile phone, or the bus driver may refuse to pickup the animal. In certain embodiments, when service is not scheduled and the owner desires service, the act of scanning may automatically enroll the animal in services for the day.

Upon arrival at a ranch, the animal is scanned into an area of the ranch that a staff member desires to place the animal in at 1310. For instance, an active dog may be scanned into an outdoor play area, such as outdoor play area 210 of FIG. 2. In some embodiments, the animal may be scanned as arrived at ranch to transfer custody from the bus driver to the ranch. This may be particularly desired in embodiments where the bus company and the ranch company are separate entities. In certain embodiments, bus franchises and ranch franchises may implemented by a franchisor dog care company. In some embodiments, scanners affixed to various locations of the ranch may scan animals when they enter a new area so less scanning effort is required from staff members and multiple animals may be relocated at once.

While at the ranch, the animal may be moved from one location to another during the day in accordance with a schedule, based on a determination by a staff member, to receive medical care, or for any other reason. If the animal is moved at 1315, the animal is scanned into the new area and the new area is stored with the central server at 1320. When it is time to leave at 1325 (e.g., when the bus arrives to take animals back), the animal is scanned and its location is saved with the central server as being on the bus, along with the kennel number, at 1330. When the bus arrives at a dropoff location associated with the animal, it may wait for a certain period of time for one or more owners who use that dropoff location to arrive and collect their animals. If the animal is retrieved at 1335, the animal is scanned and the central server is updated to indicate that the pet was delivered to its owner at 1340. The owner may be billed at this time (e.g., a credit card may be charged) or the amount may be stored for later billing on a periodic basis (e.g., monthly). If the owner does not arrive within a certain period of time at 1335, the animal may be taken back to the ranch, scanned, and have its location saved as being in a certain area of the ranch (e.g., boarding) at 1345. The owner may then be notified that the animal was taken back to the ranch and charged a fee based on when the owner picks up the animal Scheduling Services/Boarding In some embodiments, users may schedule services for their animals using a web browser or other suitable software application. FIG. 14 is a screenshot illustrating a services scheduling page 1400, according to an embodiment of the present invention. Services scheduling page 1400 allows the user to schedule grooming, veterinary care, training services, or spa services. In some embodiments, page content may change upon selection of a radio button for a service, or separate pages may be provided to schedule separate services. Here, the user has selected grooming for the pet "Indie" on Nov. 12, 2015. A calendar button may allow the user to choose a date from a calendar popup, and dates that are fully booked or otherwise unavailable may be grayed out and unselectable.

A pair of dropdown menus allow the user to select the time and "am" or "pm." In some embodiments, unavailable times may also be unselectable or unlisted. The user is also able to provide notes to the groomer or other service provider with desired instructions. In cases where a customer's payments are not up to date, all services may be "grayed out" and not selectable such that no booking is allowed.

Figure 15:
FIG. 15 is a screenshot illustrating a boarding scheduling page, according to an embodiment of the present invention.

FIG. 15 is a screenshot illustrating a boarding scheduling page 1500, according to an embodiment of the present invention. Here, the user has selected to board the pet "Sammie" from Oct. 30, 2015, to Nov. 4, 2015. The user may specify medications that are taken and instructions for when to take the medications. In some embodiments, the vaccination history and/or other medical information that was entered for the animal may be checked and verified. For instance, if the animal's rabies vaccination is not up to date, the animal may not be allowed to visit the ranch until the shot is received. Medical information may be cross-checked with a veterinarian either electronically or via telephone to double check that the medical information is accurate. Also, feeding instructions and other notes may be specified.

Remote Monitoring and Viewing

In some embodiments, users may be able to view the location of their pets and/or view their pets via video camera in real time or near-real time. This may be accomplished through a web browser or another software application. In certain embodiments, the type of information display may change based on whether the animal is at the ranch or on a bus. In other words, when a user desires to view his or her pet's location, the system may first check whether the pet is on a bus or at a ranch.

Figure 16A:
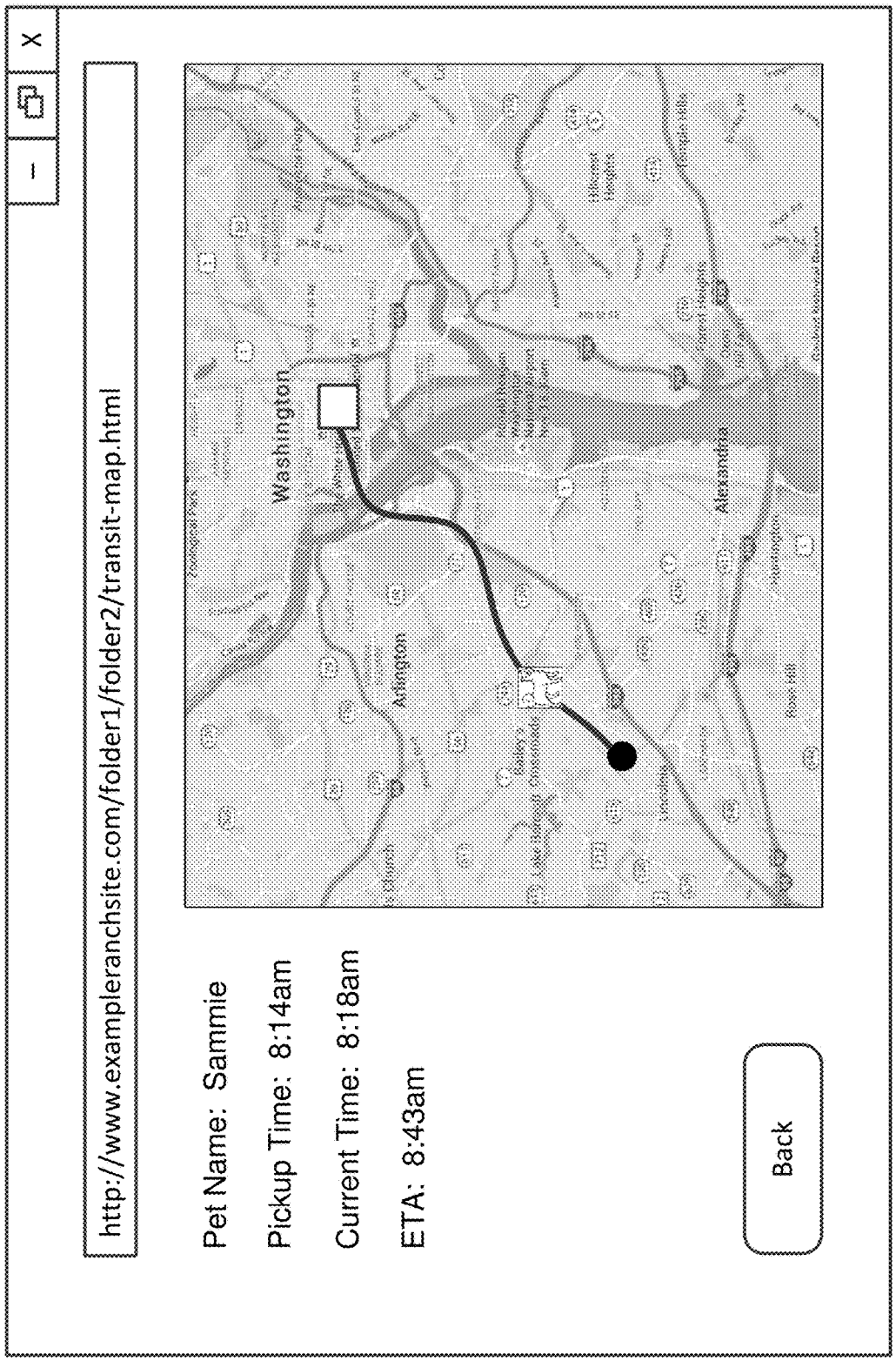
FIG. 16A is a screenshot illustrating a transit map page, according to an embodiment of the present invention.

FIG. 16A is a screenshot illustrating a transit map page 1600, according to an embodiment of the present invention. Here, a dog Sammie is currently on a bus in transit from a pickup/dropoff location to a ranch. The pickup/dropoff location, pet's current location, and ranch are shown on the map (in this case, Google Maps™ is used by the website). Based on information on the current route from Google Maps™, page 1600 estimates that Sammie will arrive at the ranch at 8:43 am.

Figure 16B:
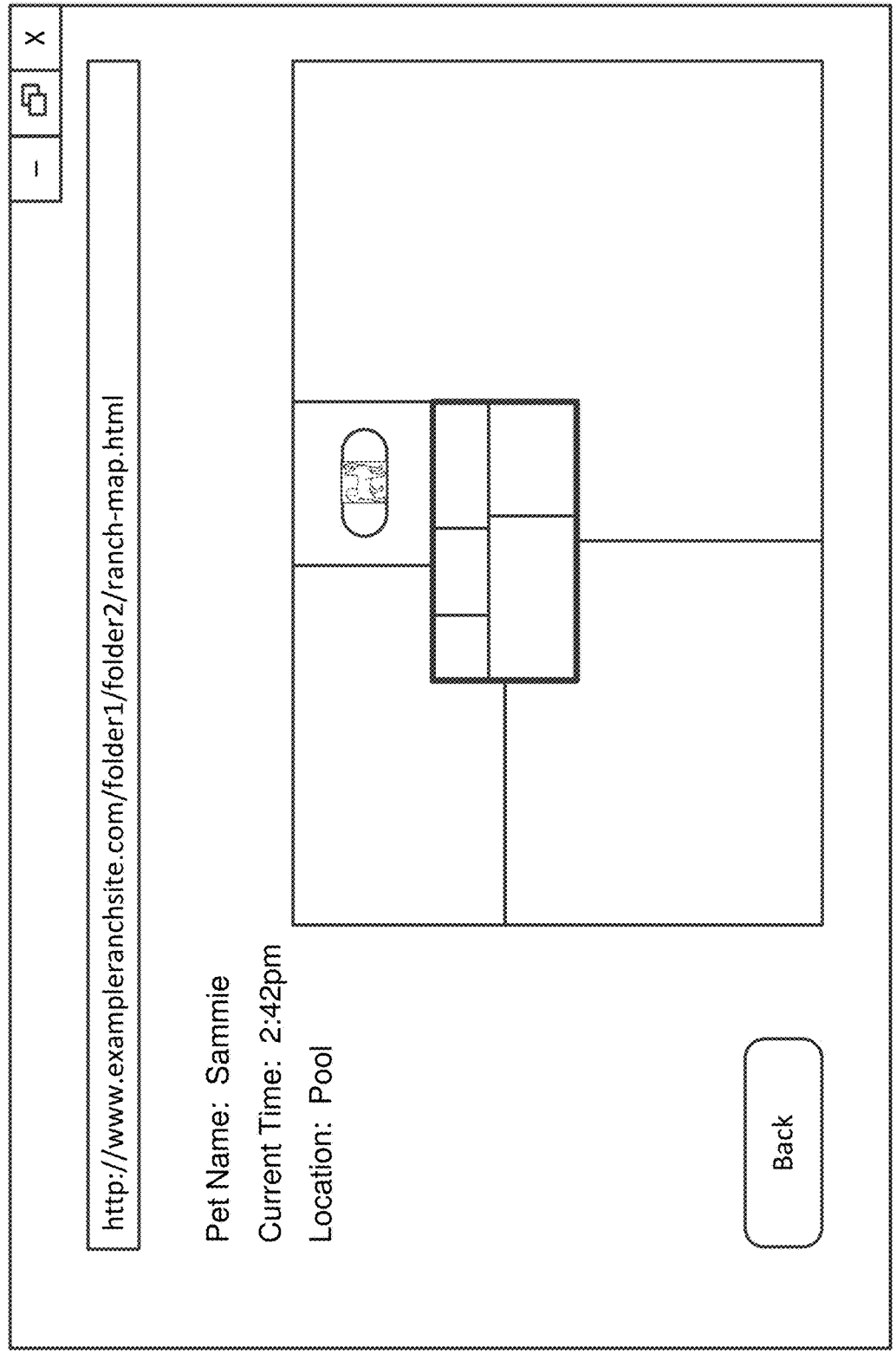
FIG. 16B is a screenshot illustrating a ranch map page, according to an embodiment of the present invention.

FIG. 16B is a screenshot illustrating a ranch map page 1610, according to an embodiment of the present invention. In FIG. 16B, the system detects that Sammie is currently at the ranch and is located at the pool. As such, his location is shown accordingly on the ranch map. In this embodiment, the pet's name, time of day, and location are also shown in text. In certain embodiments, the pet's actual location in the area may be tracked and updated on the map using the pet's RFID, transmitter, etc.

Figure 17:
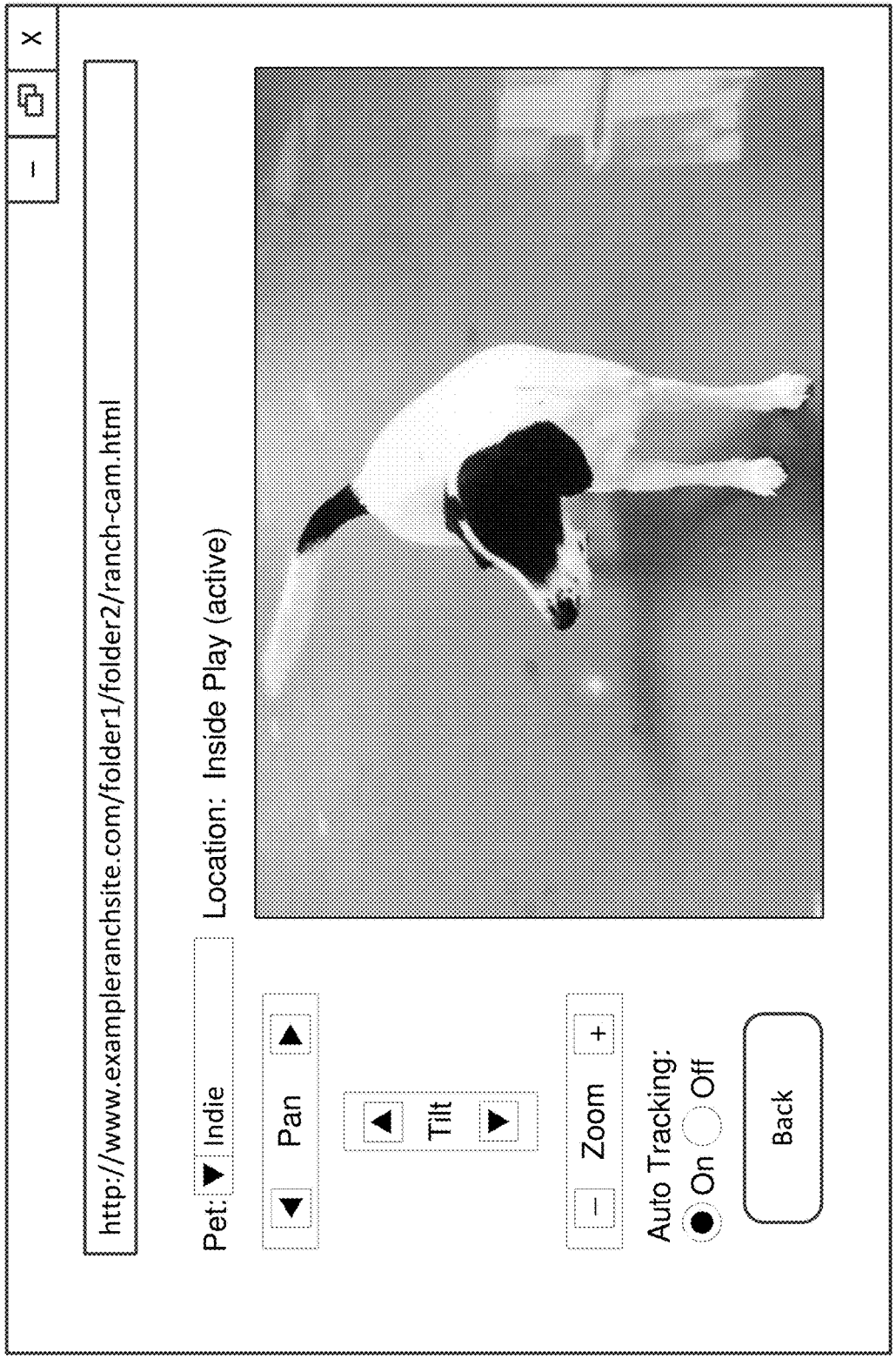
FIG. 17 is a screenshot illustrating a camera control page, according to an embodiment of the present invention.

In some embodiments, users may be able to control a camera in an area where a pet is located, or any other area where the user wants to view the animals at the ranch. FIG. 17 is a screenshot illustrating a camera control page 1700, according to an embodiment of the present invention. In this embodiment, an image of the dog Indie is displayed, and the location is indicated as the active inside play area. The user is able to manually control the camera using pan, tilt, and zoom.

In this embodiment, auto tracking functionality is also enabled, and the user has chosen to track Indie. Based on a signal from the RFID tag or transmitter, in concert with position sensing equipment, the camera is able to automatically follow the motion of the pet. This functionality can be toggled on and off in this embodiment so the user also has the option of manual control.

FIG. 18 is a screenshot illustrating a camera registration page 1800, according to an embodiment of the present invention. In page 1800, the user can select an area, a date, a time, and a camera that he or she would like to reserve. In some embodiments, cameras may be reserved for a fixed time (e.g., 5 minutes, 15 minutes, 30 minutes, etc.). In certain embodiments, reserving a camera may require a fee, which is charged by the ranch. In some embodiments, users can only reserve cameras in areas where their dog will be according to a certain schedule a certain schedule (e.g., outdoor active play from 8:00 am to 12:00 pm, grooming from 12:00-1:00 pm, indoor active play from 1:00-4:00 pm, etc.).

Figure 19:
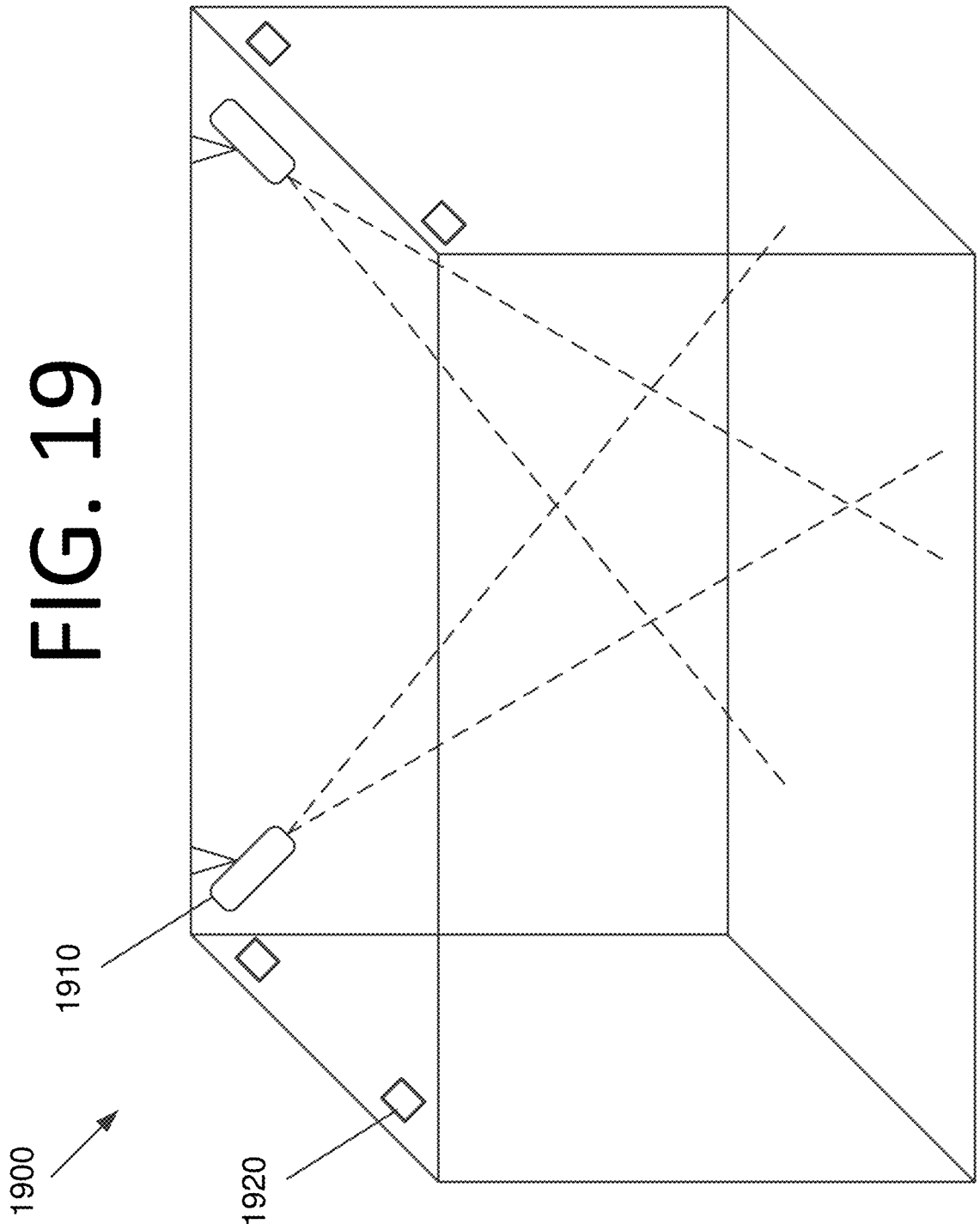
FIG. 19 is a perspective view illustrating an indoor area outfitted with cameras, according to an embodiment of the present invention.

FIG. 19 is a perspective view illustrating an indoor area 1900 outfitted with cameras 1910, according to an embodiment of the present invention. For instance, area 1900 may be an indoor play area, a spa area, or any other desired area. Any number of cameras positioned at any desired location(s) may be used without deviating from the scope of the invention. Cameras 1910 each track different areas in this embodiment. In this embodiment, a plurality of position sensors 1920 detect RFID signals or other signals from animals in area 1900. By triangulating or trilaterating signals from at least three of position sensors 1920, or by employing any other suitable location determination approach, a position of an animal in the room may be determined. For instance, the direction, the strength, or both, of the signal from the RFID tag may be used to determine position. This information, and/or calculated coordinates, can then be relayed to one or more of cameras 1910 to aim the camera at an animal, for instance. This functionality may also be applied to outdoor areas, where sensors and cameras are affixed to poles or any other suitable structure.

Figure 20:
FIG. 20 is a screenshot illustrating a video scheduling page, according to an embodiment of the present invention.

In some embodiments, users may register for one or more cameras to record their animal at a certain time and then watch the video(s) later. FIG. 20 is a screenshot illustrating a video scheduling page 2000, according to an embodiment of the present invention. In page 2000, the user can select an area, a date, a time, and a camera that he or she would like to reserve. In some embodiments, cameras may be reserved for a fixed time (e.g., 5 minutes, 15 minutes, 30 minutes, etc.). In certain embodiments, requesting a video may require a fee, which is charged by the ranch. In some embodiments, the camera is selected automatically, and users can only request videos in areas where their dog will be according to a certain schedule a certain schedule (e.g., outdoor active play from 8:00 am to 12:00 pm, grooming from 12:00-1:00 pm, indoor active play from 1:00-4:00 pm, etc.).

In some embodiments, animals are automatically detected in an area by position sensors, sensors in one or more cameras, or both. In such embodiments, the system may record a video of an area and track which animals are present for various time periods in that area. A user may then login and view the videos that have been recorded for their animals.

Figure 21:
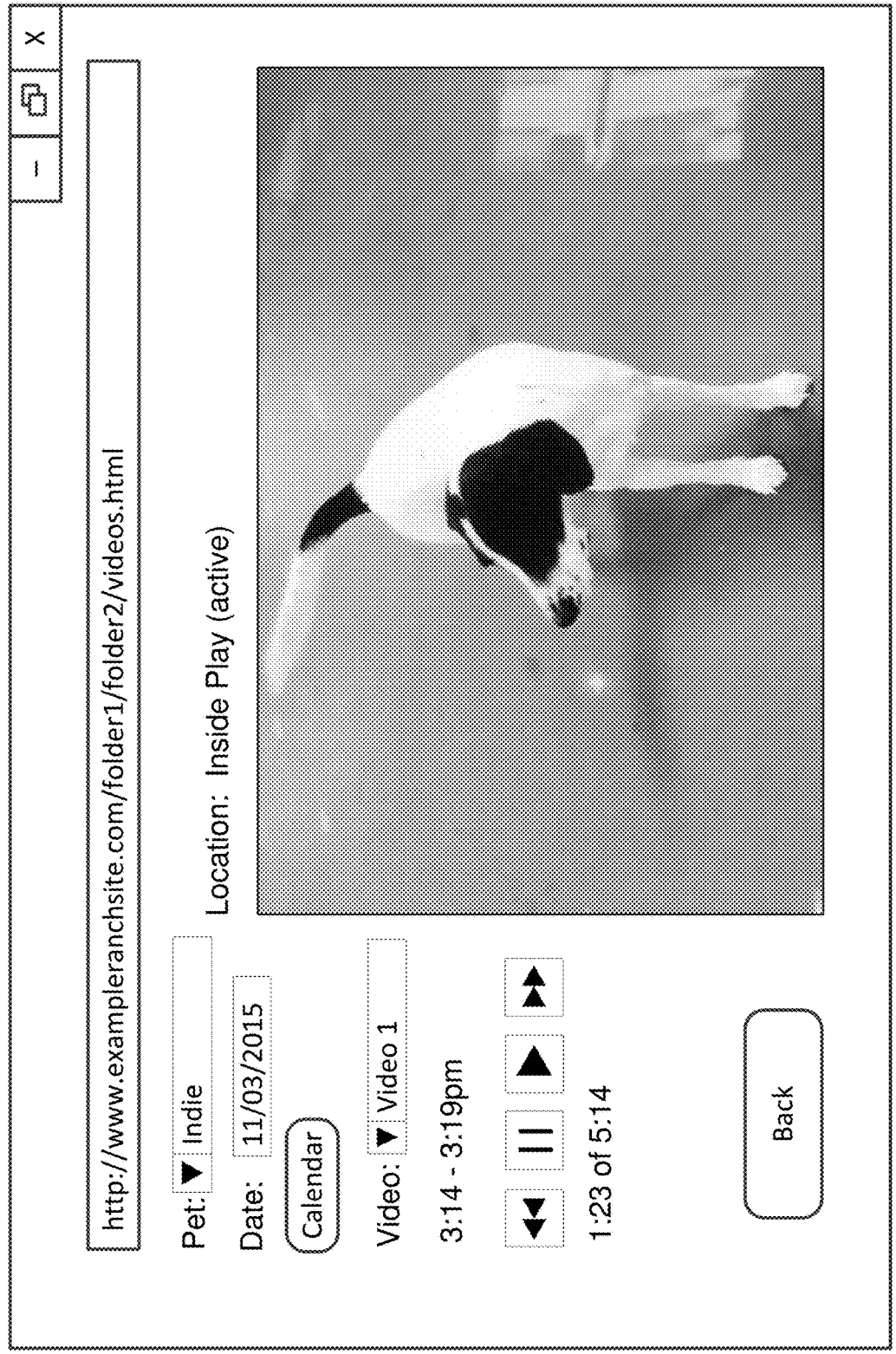
FIG. 21 is a screenshot illustrating a video selection and viewing page, according to an embodiment of the present invention.

FIG. 21 is a screenshot illustrating a video selection and viewing page 2100, according to an embodiment of the present invention. Using page 21, the user may select a pet and a date for which he or she wishes to view videos. A dropdown allows the user to select the desired video, and the time that the video was recorded is displayed. Playback buttons allow the user to navigate the video, and the length and time of the current frame is displayed.

Figure 22:
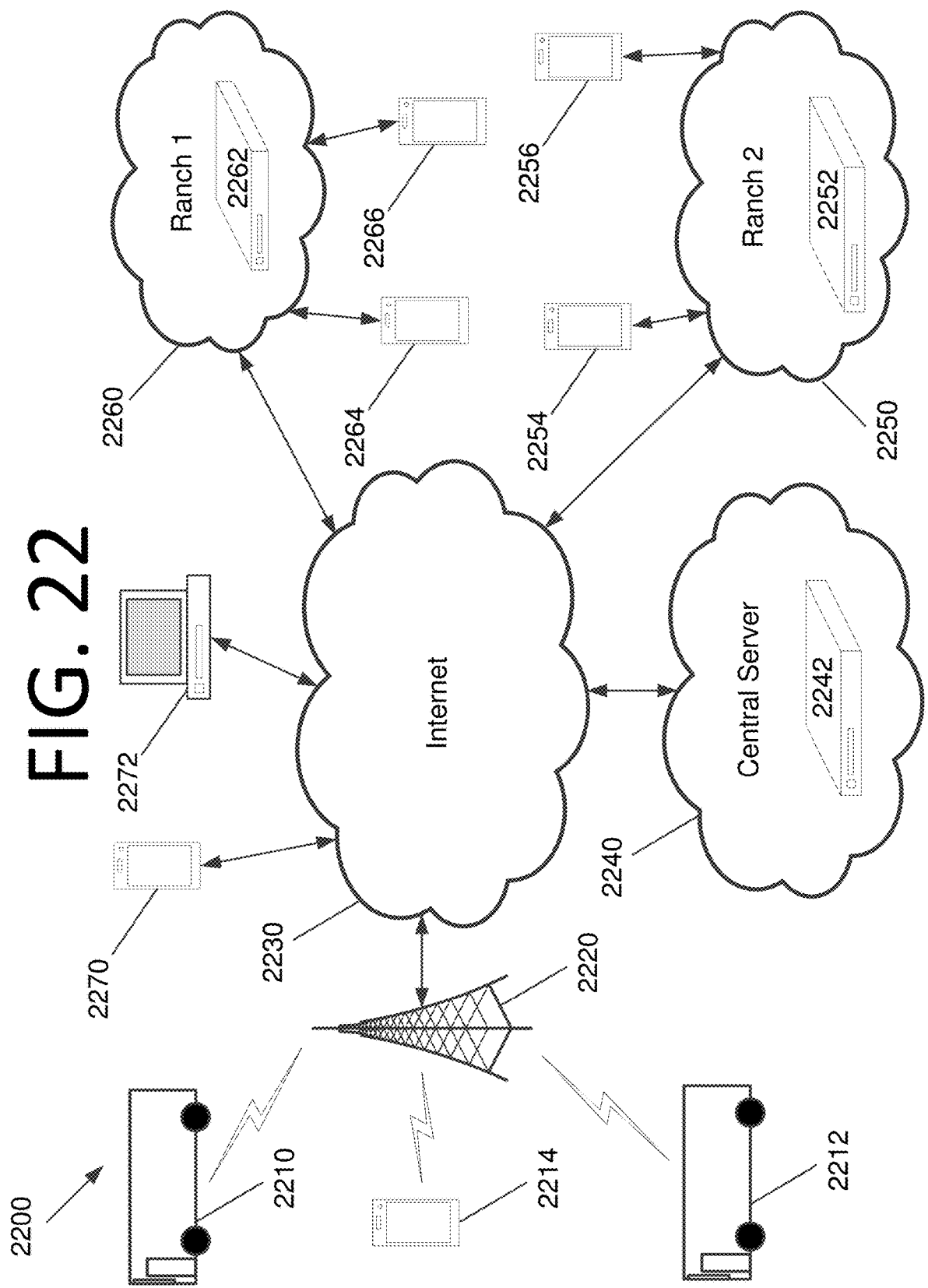
FIG. 22 is an architectural diagram illustrating a pet transportation and care system, according to an embodiment of the present invention.

FIG. 22 is an architectural diagram illustrating a pet transportation and care system 2200, according to an embodiment of the present invention. While many buses, user devices, and ranches may be included in many embodiments, only a few are shown here for illustration purposes. Computing systems of two buses 2210, 2212 and a bus driver cell phone or scanner 2214 communicate with a cell tower 2220. Communications are then passed to a central server 2242 of a central management entity 2240 (e.g., a franchisor) via the Internet 2230. As discussed above, central server 2242 may be a single computing system, distributed computing systems, cloud computing systems, an Enterprise Resource Planning (ERP) system, or any other suitable computing system(s) or combination thereof.

Also in communication with central server 2242 are servers 2252, 2262 of Ranch 1 and Ranch 2, respectively. Cell phones or scanners 2254, 2256, 2264, 2266 provide information pertaining to animals to their respective ranches. In certain embodiments, cell phones or scanners 2254, 2256, 2264, 2266 communicate with Internet 2230 via cell towers or wired connections (not shown) and on to central server 2242.

A user cell phone 2270 and user personal computer 2272 are also able to communicate with central server 2242 via the Internet 2230. The user can thus receive information regarding his or her pet(s). In certain embodiments, the user may communicate with the bus or ranch instead of with the central server.

Various information pertaining to each animal may be stored in the central server or any other computing system or combination of computing systems. The information stored for each animal in some embodiments is summarized in Table 1 below.

TABLE 1

ANIMAL INFORMATION

| | |
|---|---|
| General Information | Name, address, species, breed, weight, size, service plan, barcode/QR code/RFID tag number, etc. |
| Owner Information | Owner names, address, telephone number(s), email address(es), billing information, billing preferences, etc. |
| Medical Records | Required shots, dates performed, next due dates (may be automatically assigned), medical history, medications, date of annual checkup, allergies, etc. |
| Food Information | Type of food that is preferred, amount given, time(s) of day given, food allergies, special dietary needs, etc. |
| Grooming Profile | Suggested services for species/breed, preferred past services, timing between services, last service date, next service date, etc. |

TABLE 1-continued

ANIMAL INFORMATION

| | |
|---|---|
| Screening Information | Size, breed, code (e.g., green/yellow/red depending on the sociability and/or activity level of the animal), personality traits, grouping code for area assignment, etc. |
| Spa Profile | Record of past services, suggested services for breed, etc. |
| Daycare Service Plan | Plan selected, price, current standing, etc. |
| Service Calendar | Days available, days used, scheduling calendar, services list, etc. |

Some embodiments may have all of this information or a subset of this information, and/or include additional information without deviating from the scope of the invention. This information may also be stored in a database in any suitable form (e.g., numbers, strings, dates, etc.) without deviating from the scope of the invention.

Figure 23:
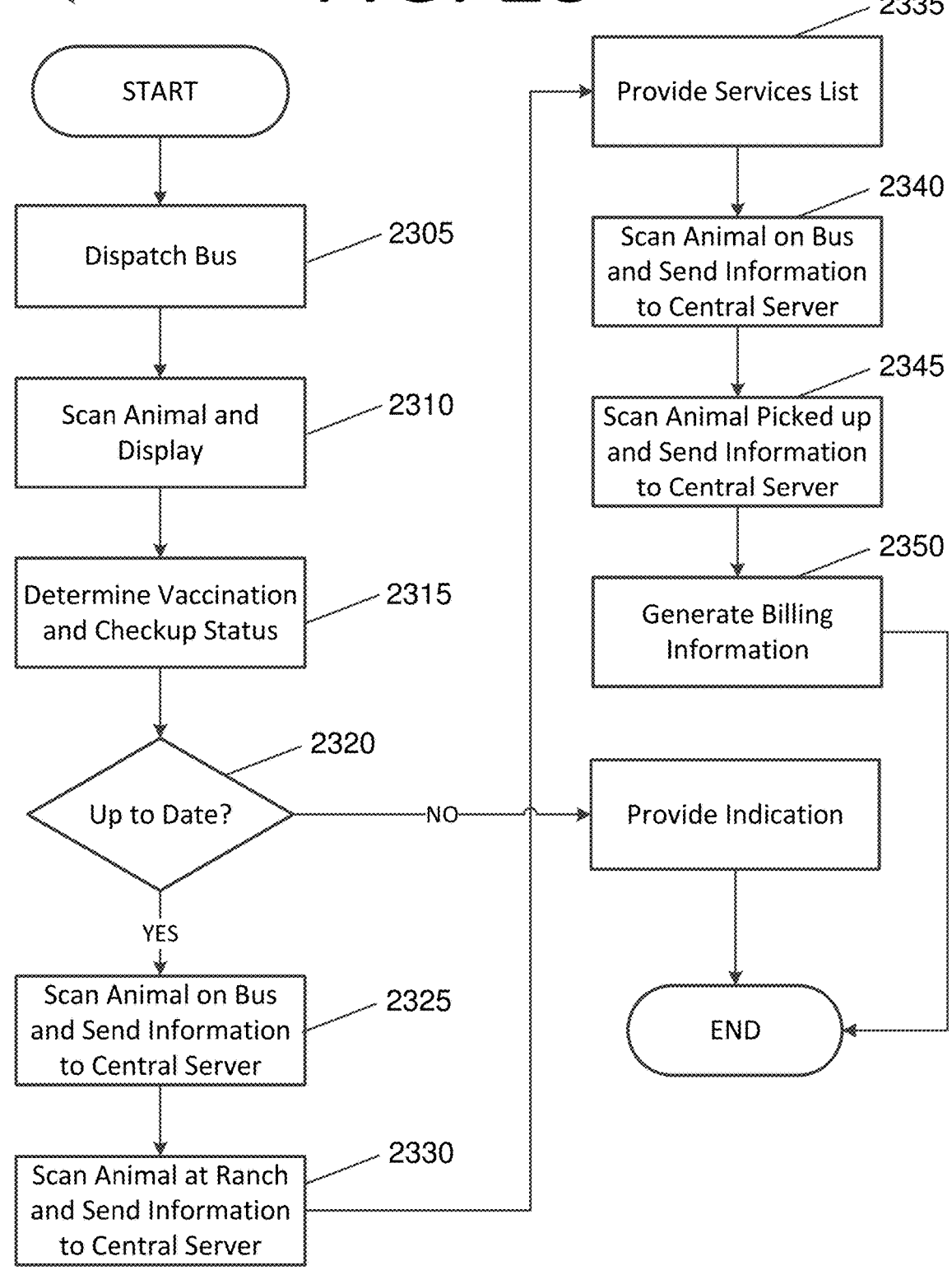
FIG. 23 is a flowchart illustrating a process for tracking and maintaining custody of an animal, according to an embodiment of the present invention.

FIG. 23 is a flowchart 2300 illustrating a process for tracking and maintaining custody of an animal, according to an embodiment of the present invention. The process begins with dispatching a bus to a first pickup/dropoff location, a second pickup/dropoff location, or both, at 2305. In other words, in some embodiments, some or all animals may not necessarily be picked up and dropped off at the same location. An animal is then scanned and an image of the animal, an authorized individual, a name of the animal, or any combination thereof, is displayed by a scanner at 2310. In some embodiments, the scanner may be a handheld scanner, a cell phone, or a scanner mounted to the bus. The animal may be scanned via a barcode, a QR code, an RFID tag, or a transmitter that is on a collar, internal to the animal, or otherwise accessible and readable by the scanner.

The system then determines whether one or more of the animal's vaccinations, a yearly checkup, or both, are overdue at 2315. If one or more of the animal's vaccinations, a yearly checkup, or both, are overdue at 2320, an indication is provided to the bus driver at 2355 via the bus driver's cell phone, handheld scanner, bus computing system, etc. indicating that the animal is not permitted to be taken onto the bus and to a ranch. The process then ends.

If one or more of the animal's vaccinations, a yearly checkup, or both, are not overdue at 2320, the animal is scanned onto the bus and information indicating that the animal has been scanned as on the bus is sent to, and received by, the central server at 2325. The central server then updates its database accordingly. In some embodiments, a kennel that the animal is located in on the bus is also recorded.

After reaching the ranch, the animal is scanned as at the ranch and information indicating that the animal has been delivered to the ranch is sent to, and received by, the central server at 2330. The central server then updates its database accordingly. In some embodiments, the kennel that the animal was located in on the bus is released. A list of services to be performed, a respective animal for each service, and a respective time for each service is provided to the ranch at 2335. Services to be performed may include grooming services, daycare services, boarding services, training services, spa services, and/or veterinary services.

When it is time to pick the animal up from the ranch, the animal is scanned onto the bus again (or a different bus) and information indicating that the animal has been scanned as on the bus is sent to, and received by, the central server at 2340. The central server then updates its database accordingly. In some embodiments, a kennel that the animal is located in on the bus is also recorded.

When the animal is picked up by an authorized individual, the animal is scanned as no longer in custody at 2345. The central server then updates its database accordingly. In some embodiments, the kennel that the animal was located in on the bus is released. In certain embodiments, an image of the authorized individual, a name of the authorized individual, or both, may be displayed to assist with identification and verification. An individual associated with the animal is then billed immediately after the animal is picked up by the authorized individual, or periodically for services performed during a predetermined time period.

Figure 24:
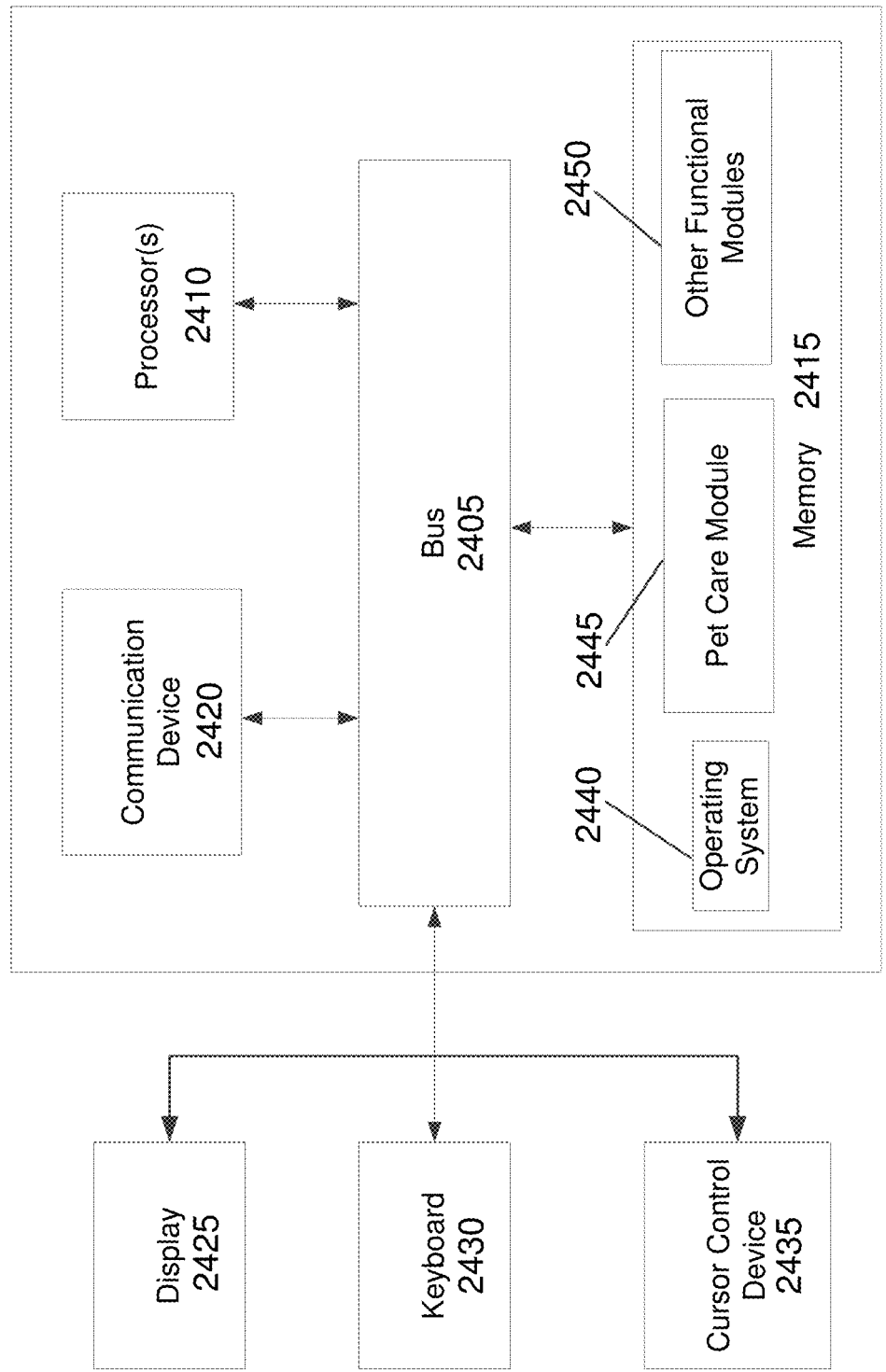
FIG. 24 illustrates a computing system configured to perform pet care operations in accordance with the devices described herein, according to an embodiment of the present invention.

FIG. 24 illustrates a computing system 2400 configured to perform pet care operations in accordance with the devices described herein, according to an embodiment of the present invention. System 2400 includes a bus 2405 or other communication mechanism for communicating information, and processor(s) 2410 coupled to bus 2405 for processing information. Processor(s) 2410 may be any type of general or specific purpose processor, including a central processing unit ("CPU") or application specific integrated circuit ("ASIC"). Processor(s) 2410 may also have multiple processing cores, and at least some of the cores may be configured for specific functions. System 2400 further includes a memory 2415 for storing information and instructions to be executed by processor(s) 2410. Memory 2415 can be comprised of any combination of random access memory ("RAM"), read only memory ("ROM"), flash memory, cache, static storage such as a magnetic or optical disk, or any other types of non-transitory computer-readable media or combinations thereof. Additionally, system 2400 includes a communication device 2420, such as a transceiver, to wirelessly provide access to a communications network.

Non-transitory computer-readable media may be any available media that can be accessed by processor(s) 2410 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 2410 are further coupled via bus 2405 to a display 2425, such as a Liquid Crystal Display ("LCD"), for displaying information to a user. A keyboard 2430 and a cursor control device 2435, such as a computer mouse, are further coupled to bus 2405 to enable a user to interface with system 2400. However, in certain embodiments such as those for mobile computing implementations, a physical keyboard and mouse may not be present, and the user may interact with the device solely through display 2425 and/or a touchpad (not shown). Any type and combination of input devices may be used as a matter of design choice.

In one embodiment, memory 2415 stores software modules that provide functionality when executed by processor(s) 2410. The modules include an operating system 2440 for system 2400. The modules further include a pet care module 2445 that is configured to perform the various pet care functionality discussed herein for a respective device. By way of non-limiting example, system 2400 may be a cell phone, a scanner, a bus computing system, a central server, a ranch computing system, part of a distributed or cloud-based computing system, or any other suitable device or collection of devices without deviating from the scope of the invention. System 2400 may include one or more additional functional modules 2450 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 13 and 23 may be performed by a computer program, encoding instructions for the nonlinear adaptive processor to perform at least the processes described in FIGS. 13 and 23, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 13 and 23, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A vehicle kennel system for safely housing animals and tracking custody, comprising:
   a vehicle;
   a plurality of kennels located within the vehicle, each kennel configured to house a respective animal;
   an attachment mechanism that securely attaches the plurality of kennels to the vehicle;
   a scanner comprising a processor, a communication device, and memory, the scanner configured to detect an identifier (ID) associated with an animal and facilitate the tracking of the custody of the animal when on the vehicle, the scanner configured to:
   based on the detected ID, transmit an indication to a server or another computing system that the animal has been picked up, an indication of which kennel of the plurality of kennels that the animal has been assigned to, or both, and
   transmit another indication to the server or another computing system that the animal has been dropped off after the vehicle arrives at its destination; and
   a flushing and drainage system, comprising:
   a plurality of trays configured to receive waste from animals located in the plurality of kennels,
   a plurality of gutters configured to receive the waste from the plurality of trays, and
   a plurality of downspouts configured to receive the waste from the plurality of trays, wherein
   the plurality of downspouts exit a bottom of the vehicle via respective holes in the floor of the vehicle such that waste exits the vehicle when the trays are flushed with water, cleaner, or both,
   wherein the vehicle kennel system is configured to accommodate animals being picked up and dropped off routinely over a plurality of days.

2. The vehicle kennel system of claim 1, wherein the attachment mechanism comprises a plurality of racks that collectively hold the plurality of kennels in place via being attached to a side of the vehicle, a floor of the vehicle, or both.

3. The vehicle kennel system of claim 2, wherein
   each rack comprises connection mechanisms that enable at least one kennel of the plurality of kennels to be affixed thereto, and
   each kennel comprises corresponding connectors that are configured to engage with the connection mechanisms and securely hold the respective kennel in place.

4. The vehicle kennel system of claim 3, further comprising:
   a system of horizontal shelves that are operably connected to the plurality of racks, the system of shelves supporting the plurality of kennels; and
   vertical supports that support at least one shelf of the shelf system.

5. The vehicle kennel system of claim 1, wherein the plurality of trays, the plurality of gutters, or both, are positioned at a non-horizontal angle to facilitate better flow of the water, waste, and cleaner to the gutters.

6. The vehicle kennel system of claim 1, further comprising:
   a barcode or QR code associated with the animal and affixed to an item worn by the animal, wherein
   the scanner is configured to:
   scan the barcode or the QR code associated with the animal, and determine the ID of the animal from the scanned barcode or QR code.

7. The vehicle kennel system of claim 1, further comprising:
a passive radio frequency identifier (RFID) tag associated with the animal, wherein
the scanner is configured to:
generate a signal, via the communication device, that causes the passive RFID tag to transmit the ID associated with the animal, and
detect the ID associated with the animal that was transmitted by the passive RFID tag, via the communication device.

8. The vehicle kennel system of claim 1, further comprising:
a transmitter or microchip associated with the animal, wherein
the scanner is configured to:
detect the ID associated with the animal transmitted by the transmitter or the microchip, via the communication device.

9. The vehicle kennel system of claim 1, wherein each kennel comprises a transmitter configured to detect a passive RFID tag, a transmitter, or a microchip associated with the animal within a respective kennel and to transmit information indicating that the animal is housed within the kennel to a server or another computing system.

10. The vehicle kennel system of claim 1, wherein the scanner is a cell phone.

11. The vehicle kennel system of claim 1, wherein
the scanner comprises a display, and
the scanner is configured to display information that comprises a day that has been reserved for the animal to attend a ranch facility, a name and/or image of a person that is to drop the animal off, health information pertaining to the animal, an image of an owner of the animal, a name of the owner of the animal, a listing of pets of the owner, a name of the currently detected animal, an image of the currently detected animal, a kennel to which the animal is assigned, or any combination thereof.

12. A vehicle kennel system for safely housing animals and tracking custody, comprising:
a vehicle comprising a bottom with a plurality of holes;
a plurality of kennels located within the vehicle; and
an attachment mechanism that securely attaches the plurality of kennels to the vehicle, the attachment mechanism comprising a plurality of racks that collectively hold the plurality of kennels in place via being attached to a side of the vehicle, being attached to a floor of the vehicle, or both; and
a scanner comprising a processor, a communication device, and memory, the scanner configured to detect an identifier (ID) associated with an animal and facilitate the tracking of the custody of the animal when on the vehicle;
a flushing and drainage system, comprising:
a plurality of trays configured to receive waste from animals located in the plurality of kennels;
a plurality of gutters configured to receive the waste from the plurality of trays; and
a plurality of downspouts configured to receive the waste from the plurality of trays, wherein
the plurality of downspouts exit a bottom of the vehicle via respective holes in the floor of the vehicle such that waste exits the vehicle when the trays are flushed with water, cleaner, or both;
wherein each rack comprises connection mechanisms that enable at least one kennel of the plurality of kennels to be affixed thereto;
each kennel comprises corresponding connectors that are configured to engage with the connection mechanisms and hold the kennel in place;
the scanner is configured to:
based on the detected ID, transmit an indication to a server or another computing system that the animal has been picked up, an indication of which kennel of the plurality of kennels that the animal has been assigned to, or both; and
transmit another indication to the server or another computing system that the animal has been dropped off after the vehicle arrives at its destination; and
the vehicle kennel system is configured to accommodate animals being picked up and dropped off routinely over a plurality of days.

13. The vehicle kennel system of claim 12, further comprising:
a system of horizontal shelves that are operably connected to the plurality of racks, the system of shelves supporting the plurality of kennels; and
vertical supports that support at least one shelf of the shelf system.

14. The vehicle kennel system of claim 1, wherein the vehicle kennel system is configured to track that at least one animal housed in a kennel is dropped off at a different location than at least one other animal.

15. The vehicle kennel system of claim 1, wherein when an animal is scanned, the scanner is configured to display an image of the animal, a name of the animal, a name of the owner, or a combination thereof.

16. The vehicle kennel system of claim 1, wherein when an animal is scanned and an account associated with the animal is not paid in full or the animal is not up to date on medical requirements, the scanner is configured to display an indication that the animal is not permitted to enter the vehicle.

17. The vehicle kennel system of claim 1, wherein the vehicle kennel system is configured to provide a list of services for an animal when the animal arrives at and is scanned at a ranch.

* * * * *